US006552704B2

(12) United States Patent
Zavracky et al.

(10) Patent No.: US 6,552,704 B2
(45) Date of Patent: *Apr. 22, 2003

(54) COLOR DISPLAY WITH THIN GAP LIQUID CRYSTAL

(75) Inventors: Matthew Zavracky, Plympton, MA (US); Wen-Foo Chern, Wayland, MA (US); Hiap L. Ong, Taipai (TW); John C. C. Fan, Chestnut Hill, MA (US); Bor-Yeu Tsaur, Lexington, MA (US); Alan Richard, Wrentham, MA (US)

(73) Assignee: Kopin Corporation, Taunton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,744

(22) Filed: Oct. 31, 1997

(65) Prior Publication Data

US 2001/0045927 A1 Nov. 29, 2001

(51) Int. Cl.[7] .................................................. G09G 3/36
(52) U.S. Cl. ............................................ 345/88; 345/99
(58) Field of Search ............................. 345/88, 87, 89, 345/90, 56, 57, 55, 7, 8, 9, 92; 349/41, 11, 13, 155, 156

(56) References Cited

U.S. PATENT DOCUMENTS

| | | | |
|---|---|---|---|
| 4,010,322 A | 3/1977 | Nathanson | 358/233 |
| 4,159,417 A | 6/1979 | Rubincam | 235/375 |
| 4,258,387 A | 3/1981 | Lemelson et al. | 358/85 |
| 4,336,524 A | 6/1982 | Levine | 340/311.1 |
| 4,532,506 A * | 7/1985 | Kitazima et al. | 345/90 |
| 4,573,766 A | 3/1986 | Bournay, Jr., et al. | 350/345 |
| 4,630,895 A | 12/1986 | Abdala, Jr. et al. | 350/345 |

(List continued on next page.)

FOREIGN PATENT DOCUMENTS

| | | |
|---|---|---|
| EP | 0 172 473 A2 | 2/1986 |
| EP | 0 344 881 A2 | 12/1989 |
| EP | 0 352 914 A2 | 1/1990 |
| EP | 0 424 880 A2 | 5/1991 |
| EP | 0 438 362 A1 | 7/1991 |
| EP | 0 464 011 A1 | 1/1992 |
| WO | WO 98/27538 | 6/1998 |
| WO | WO 98/27539 | 6/1998 |
| WO | WO 98/27540 | 6/1998 |
| WO | WO 99/34246 | 7/1999 |

*Primary Examiner*—Richard Hjerpe
*Assistant Examiner*—Ronald Laneau
(74) *Attorney, Agent, or Firm*—Hamilton, Brook, Smith & Reynolds, P.C.

(57) ABSTRACT

An active matrix color sequential liquid crystal display has an active matrix circuit, a counterelectrode panel and an interposed layer of liquid crystal. The active matrix circuit has an array of transistor circuits formed in a first plane. Each transistor circuit is connected to a pixel electrode in an array of pixel electrodes having a small area. The counterelectrode panel extends in a second plane that is parallel to the first plane, such that the counterelectrode panel receives an applied voltage. The liquid crystal layer is interposed in a cavity between the two planes. In a preferred embodiment, an oxide layer extends over the pixel electrode array. The oxide can have a first thickness in a peripheral region around the array of the pixel electrodes and a thinner second thickness in a pixel electrode region extending over the array of pixel electrodes.

7 Claims, 35 Drawing Sheets

U.S. PATENT DOCUMENTS

| | | | |
|---|---|---|---|
| 4,636,866 A | 1/1987 | Hattori | 358/236 |
| 4,695,129 A | 9/1987 | Faessen et al. | 350/96.25 |
| 4,704,740 A | 11/1987 | McKee et al. | 455/348 |
| 4,714,980 A | 12/1987 | Hara | 361/395 |
| 4,814,876 A | 3/1989 | Horio et al. | 358/160 |
| 4,837,817 A | 6/1989 | Maemori | 358/224 |
| 4,856,045 A | 8/1989 | Hoshina | 379/53 |
| 4,856,088 A | 8/1989 | Oliwa et al. | 455/349 |
| 4,873,576 A | 10/1989 | Hattori et al. | 358/224 |
| 4,916,441 A | 4/1990 | Gombrich | 340/712 |
| 4,917,469 A | 4/1990 | Ross | 350/332 |
| 4,928,300 A | 5/1990 | Ogawa et al. | 379/53 |
| 4,934,773 A | 6/1990 | Becker | 350/6.6 |
| 4,958,915 A | 9/1990 | Okada et al. | 350/345 |
| 4,959,642 A | 9/1990 | Sharples | 340/716 |
| 4,977,456 A | 12/1990 | Furuya | 358/213.13 |
| 4,985,697 A | 1/1991 | Boulton | 340/750 |
| 5,003,300 A | 3/1991 | Wells | 340/705 |
| 5,008,658 A | 4/1991 | Russay et al. | 340/784 |
| 5,008,788 A | 4/1991 | Palinkas | 362/231 |
| 5,012,274 A | 4/1991 | Dolgoff | 340/702 |
| 5,023,931 A | 6/1991 | Streck et al. | 455/21 |
| 5,042,918 A | 8/1991 | Suzuki | 359/59 |
| 5,048,077 A | 9/1991 | Wells et al. | 379/96 |
| 5,077,784 A | 12/1991 | Fujita et al. | 379/53 |
| 5,079,627 A | 1/1992 | Filo | 358/85 |
| 5,087,113 A | 2/1992 | Sakono et al. | 359/59 |
| 5,106,179 A | 4/1992 | Kamaya et al. | 351/158 |
| 5,111,498 A | 5/1992 | Guichard et al. | 379/53 |
| 5,122,880 A | 6/1992 | Nagano | 358/209 |
| 5,132,825 A | 7/1992 | Miyadera | 359/85 |
| 5,138,312 A | 8/1992 | Tsukamoto et al. | 340/825.44 |
| 5,162,828 A | 11/1992 | Furness et al. | 353/122 |
| 5,164,833 A | 11/1992 | Aoki | 358/224 |
| 5,164,980 A | 11/1992 | Bush et al. | 379/53 |
| 5,177,405 A | 1/1993 | Kusuda et al. | 315/169.1 |
| 5,185,712 A | 2/1993 | Sato et al. | 358/224 |
| 5,189,632 A | 2/1993 | Paajanen et al. | 364/705.05 |
| 5,199,104 A | 3/1993 | Hirayama | 395/145 |
| 5,206,749 A | 4/1993 | Zavracky et al. | 359/59 |
| 5,220,366 A | 6/1993 | King | 354/76 |
| 5,224,198 A | 6/1993 | Jachimowicz et al. | 385/133 |
| 5,239,665 A | 8/1993 | Tsuchiya | 395/800 |
| 5,256,562 A | 10/1993 | Vu et al. | 437/86 |
| 5,258,325 A | 11/1993 | Spitzer et al. | 437/86 |
| 5,260,625 A | 11/1993 | Holden et al. | 313/486 |
| 5,280,372 A | 1/1994 | Horiuchi | 359/49 |
| 5,281,957 A | 1/1994 | Schoolman | 345/8 |
| 5,300,788 A | 4/1994 | Fan et al. | 257/13 |
| 5,300,976 A | 4/1994 | Lim et al. | 354/219 |
| 5,305,244 A | 4/1994 | Newman et al. | 364/708.1 |
| 5,311,206 A | 5/1994 | Nelson | 345/89 |
| 5,317,236 A | 5/1994 | Zavracky et al. | 315/169.3 |
| 5,321,416 A | 6/1994 | Bassett et al. | 345/8 |
| 5,322,989 A | 6/1994 | Long et al. | 235/375 |
| 5,325,429 A | 6/1994 | Kurgan | 379/429 |
| 5,331,333 A | 7/1994 | Tagawa et al. | 345/7 |
| 5,335,276 A | 8/1994 | Thompson et al. | 380/21 |
| 5,337,068 A | 8/1994 | Stewart et al. | 345/88 |
| 5,347,378 A | 9/1994 | Handschy et al. | 359/53 |
| 5,347,400 A | 9/1994 | Hunter | 359/815 |
| 5,362,671 A | 11/1994 | Zavracky et al. | 437/81 |
| 5,363,225 A | 11/1994 | Minamihara et al. | 359/56 |
| 5,371,493 A | 12/1994 | Sharpe et al. | 340/825.34 |
| 5,373,181 A | 12/1994 | Scheiter et al. | 257/415 |
| 5,376,979 A | 12/1994 | Zavracky et al. | 353/122 |
| 5,381,179 A | 1/1995 | Kashimura | 348/376 |
| 5,381,309 A | 1/1995 | Borchardt | 362/31 |
| 5,402,143 A | 3/1995 | Ge et al. | 345/102 |
| 5,404,580 A | 4/1995 | Simpson et al. | 455/89 |
| 5,412,396 A | 5/1995 | Nelson | 345/89 |
| 5,416,496 A * | 5/1995 | Wood | 345/102 |
| 5,422,656 A | 6/1995 | Allard et al. | 345/173 |
| 5,432,358 A | 7/1995 | Nelson et al. | 257/81 |
| 5,440,197 A | 8/1995 | Gleckman | 313/110 |
| 5,444,557 A | 8/1995 | Spitzer et al. | 359/59 |
| 5,455,572 A | 10/1995 | Cannon et al. | 340/825.44 |
| 5,469,278 A | 11/1995 | Takahara et al. | 359/51 |
| 5,471,045 A | 11/1995 | Geronimi | 235/492 |
| 5,483,285 A | 1/1996 | Lim et al. | 348/341 |
| 5,485,318 A | 1/1996 | Lebby et al. | 359/811 |
| 5,485,504 A | 1/1996 | Ohnsorge | 379/58 |
| 5,486,708 A | 1/1996 | Takahashi et al. | 257/59 |
| 5,486,946 A | 1/1996 | Jachimowicz et al. | 359/263 |
| 5,493,437 A | 2/1996 | Lebby et al. | 359/152 |
| 5,495,287 A | 2/1996 | Kasai et al. | 345/89 |
| 5,500,517 A | 3/1996 | Cagliostro | 235/486 |
| 5,506,705 A | 4/1996 | Yamamoto et al. | 359/40 |
| 5,515,424 A | 5/1996 | Kenney | 379/96 |
| 5,528,285 A | 6/1996 | Morikawa et al. | 348/14 |
| 5,528,397 A * | 6/1996 | Zavracky et al. | 359/59 |
| 5,537,129 A | 7/1996 | Okada et al. | 345/90 |
| 5,539,554 A | 7/1996 | Lebby et al. | 359/83 |
| 5,541,640 A | 7/1996 | Larson | 348/19 |
| 5,544,111 A | 8/1996 | Berthozat et al. | 365/225.7 |
| 5,548,271 A | 8/1996 | Tsuchiyama et al. | 340/311.1 |
| 5,549,747 A | 8/1996 | Bozler et al. | 117/43 |
| 5,561,538 A | 10/1996 | Kato et al. | 359/40 |
| 5,572,045 A | 11/1996 | Takahashi et al. | 257/59 |
| 5,579,165 A | 11/1996 | Michel et al. | 359/630 |
| 5,584,070 A | 12/1996 | Harris et al. | 455/346 |
| 5,585,948 A | 12/1996 | Petera | 349/143 |
| 5,596,451 A | 1/1997 | Handschy et al. | 359/633 |
| 5,606,342 A | 2/1997 | Shoji et al. | 345/94 |
| 5,608,553 A | 3/1997 | Kim | 349/61 |
| 5,634,080 A | 5/1997 | Kikinis et al. | 395/893 |
| 5,640,174 A | 6/1997 | Kamei et al. | 345/89 |
| 5,642,129 A | 6/1997 | Zavracky et al. | 345/100 |
| 5,646,432 A | 7/1997 | Iwaki et al. | 257/347 |
| 5,666,133 A | 9/1997 | Matsuo et al. | 345/100 |
| 5,682,214 A | 10/1997 | Amako et al. | 349/74 |
| 5,684,354 A | 11/1997 | Gleckman | 313/110 |
| 5,694,147 A | 12/1997 | Gaalema et al. | 345/101 |
| 5,705,424 A * | 1/1998 | Zavracky et al. | 345/92 |
| 5,726,671 A | 3/1998 | Ansley et al. | 345/8 |
| 5,734,875 A | 3/1998 | Cheng | 395/516 |
| 5,748,160 A * | 5/1998 | Shieh et al. | 345/82 |
| 5,748,237 A | 5/1998 | Ueda et al. | 348/333 |
| 5,757,445 A | 5/1998 | Vu et al. | 349/45 |
| 5,761,485 A | 6/1998 | Munyan | 395/500 |
| 5,767,828 A | 6/1998 | McKnight | 345/89 |
| 5,777,594 A | 7/1998 | Miyawaki | 345/102 |
| 5,806,950 A | 9/1998 | Gale et al. | 353/78 |
| 5,812,101 A | 9/1998 | Monarchie et al. | 345/8 |
| 5,815,126 A | 9/1998 | Fan et al. | 345/8 |
| 5,815,228 A | 9/1998 | Flynn | 349/71 |
| 5,818,634 A | 10/1998 | Richard et al. | 359/565 |
| 5,821,911 A | 10/1998 | Jachimowicz | 345/7 |
| 5,867,795 A | 2/1999 | Novis et al. | 455/566 |
| 5,892,325 A | 4/1999 | Gleckman | 313/578 |
| 5,920,298 A | 7/1999 | McKnight | 345/87 |
| 5,926,218 A | 7/1999 | Smith | 348/358 |
| 5,929,958 A | 7/1999 | Ohta et al. | 349/141 |
| 6,007,209 A | 12/1999 | Pelka | 362/30 |
| 6,073,034 A | 6/2000 | Jacobsen et al. | 455/566 |
| 6,151,004 A | 11/2000 | Kaneko | 345/88 |
| 6,205,199 B1 | 3/2001 | Polichar et al. | 378/98.8 |

* cited by examiner

COLOR DISPLAY WITH THIN GAP LIQUID CRYSTAL

BACKGROUND OF THE INVENTION

Flat-panel displays are being developed which utilize liquid crystals or electroluminescent materials to produce high quality images. These displays are expected to supplant cathode ray tube (CRT) technology and provide a more highly defined television picture or computer monitor image. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent grey scale that can be attained with TFT-compatible LCDs.

Color liquid crystal flat panel displays can be made in several different ways including with color filters or sequentially flashing lights. Both style displays are found in transmissive or reflective models.

Transmissive color filter liquid crystal flat panel displays generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will allow transmission of light in the material when an electric field is applied across the material between the circuit panel and a ground affixed to the filter plate. Thus, when a particular pixel of the display is turned on by the TFTs, the liquid crystal material rotates polarized light being transmitted through the material so that the light will pass through the second polarizing filter.

In sequential color displays, the display panel is triple scanned, once for each primary color. For example, to produce color frames at 20 Hz, the active matrix must be driven at a frequency of 60 Hz. In order to reduce flicker, it is desirable to drive the active matrix at 180 Hz to produce a 60 Hz color image. At over 60 Hz, visible flicker is reduced.

Owing to the limitations of amorphous silicon, other alternative materials include polycrystalline silicon, or laser recrystallized silicon. These materials are limited as they use silicon that is already on glass, which generally restricts further circuit processing to low temperatures.

Integrated circuits for displays, such as, the above referred color sequential display, are becoming more and more complex. For example, the color sequential display is designed for displaying High Definition Television (HDTV) formats requiring a 1280-by-1024 pixel array with a pixel pitch, or the distance between lines connecting adjacent columns or rows of pixel electrodes, being in the range of 15–55 microns, and fabricated on a single five-inch wafer.

SUMMARY OF THE INVENTION

In accordance with the invention, the cost and complexity of high resolution displays are significantly reduced by fabricating multiple integrated displays of reduced size on a single wafer and then dicing the wafer to produce a plurality of display devices.

The displays are then assembled with appropriate magnifying optics to form a portable display system of low cost and reduced size. Included in the optics is a magnification system which compensates for the small image size by magnifying and projecting the image at an appropriate distance for viewing.

In preferred embodiments, an active matrix color sequential liquid crystal display has an active matrix circuit, a counterelectrode, panel and an interposed layer of liquid crystal. The active matrix circuit has an array of transistor circuits formed in a first plane. Each transistor circuit is connected to a pixel electrode in an array of pixel electrodes having an area of 200 $mm^2$ or less and preferably under 100 $mm^2$. The counterelectrode panel extends in a second plane that is parallel to the first plane, such that the counterelectrode panel receives an applied voltage. The liquid crystal layer is interposed in a cavity between the two planes. The cavity has a depth along an axis perpendicular to the first and second planes of less than 3 microns.

In a preferred embodiment, an oxide layer extends between the pixel electrode array and a layer of liquid crystal material. The oxide has a first thickness in a peripheral region around the array of pixel electrodes and a thinner second thickness in a pixel electrode region extending over the array of pixel electrodes. The thick peripheral region (about 0.5 microns in a preferred embodiment) serves to better isolate the driver electrodes integrated into the display circuit. The thinner oxide region (about 0.3 microns) serves to reduce the voltage drop across the oxide during display operations. This serves to increase the applied voltage on the liquid crystal without the need to draw more power from the power source such as a battery.

In a preferred embodiment, the liquid crystal is a superfluoriated material. This material has the desired combination of characteristics that improves color sequential operation. A preferred method of controlling the liquid crystal in the display includes switching the applied voltage to the counterelectrode panel after every subframe.

BRIEF DESCRIPTION OF THE DRAWINGS

The above and other objects and features of the invention will be better understood and appreciated by those skilled in the art in view of the description of the preferred embodiments given below in conjunction with the accompanying drawings, in which.

DETAILED DESCRIPTION OF THE INVENTION

High Resolution Active Matrix Microdisplay

Figure 1:
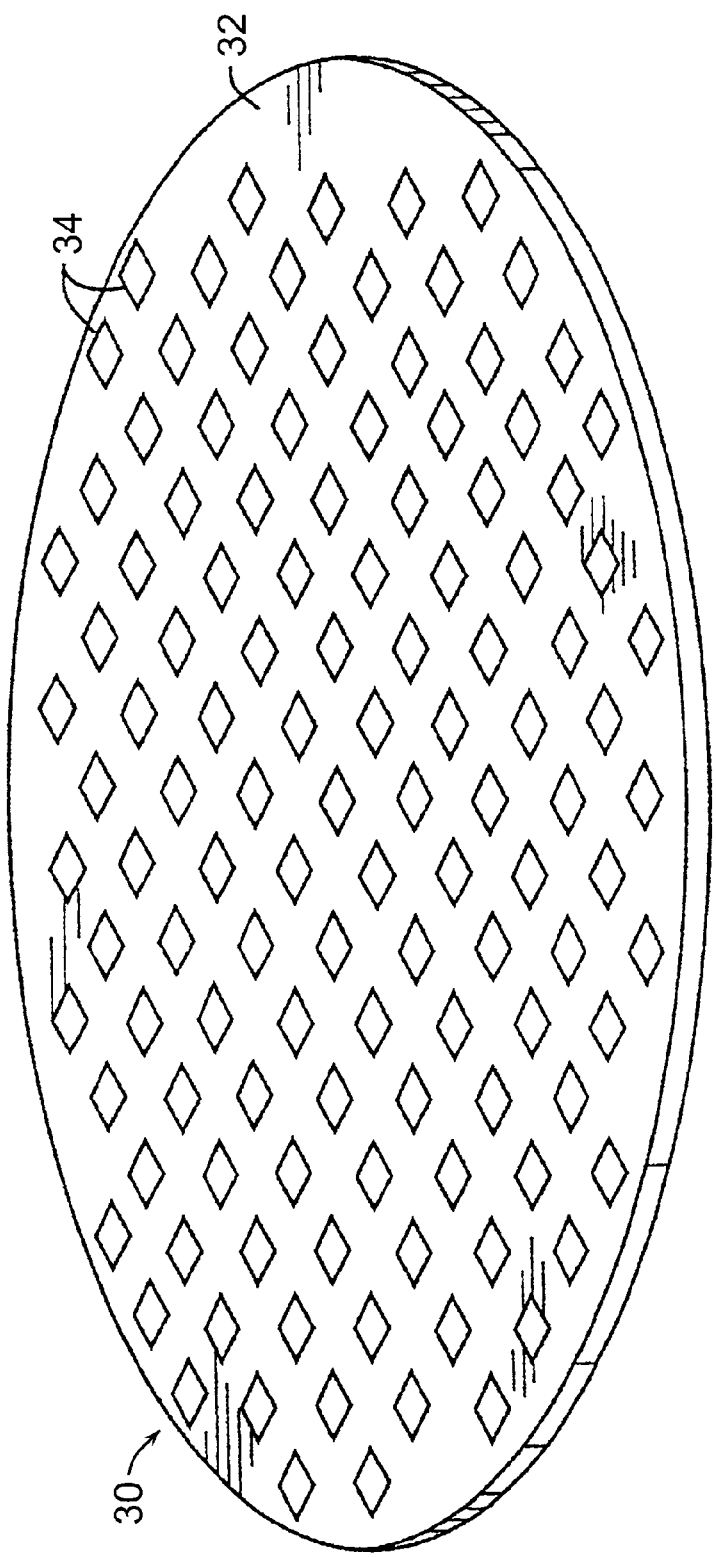
FIG. 1 is a perspective view of a single wafer having a plurality of display devices formed thereon in accordance with the invention.

A preferred embodiment of the invention utilizes a process of making a plurality of flat panel displays 30 in which a large number of active matrix arrays 34 are fabricated on a single wafer 32 as illustrated in connection with FIG. 1.

The number of displays fabricated on a single wafer depends upon the size of the wafer and the size of each display. A preferred embodiment of the invention, for example, uses a high resolution display having an imaging area of the display with a diagonal of 0.24 inches or less. The active display area is 4.8 mm×3.6 mm and has a total display dimension of 11.8 mm×6.8 mm. 120 separate displays can be fabricated on a single five inch wafer.

By fabricating a large number of small high resolution displays on a single wafer the manufacturing yield can be substantially increased and the cost per display can be substantially reduced.

To obtain monochrome or color sequential resolutions of at least 75,000 pixels (e.g. a 320×240 array) on a 0.25 inch diagonal display the pixel electrodes are preferably on the order of about 15 microns in width or less. To obtain a resolution of at least 300,000 pixels (e.g. 640×480 array) on a 0.25 inch diagonal display the pixel electrodes preferably have a width of about 8–10 microns.

Figure 2A:
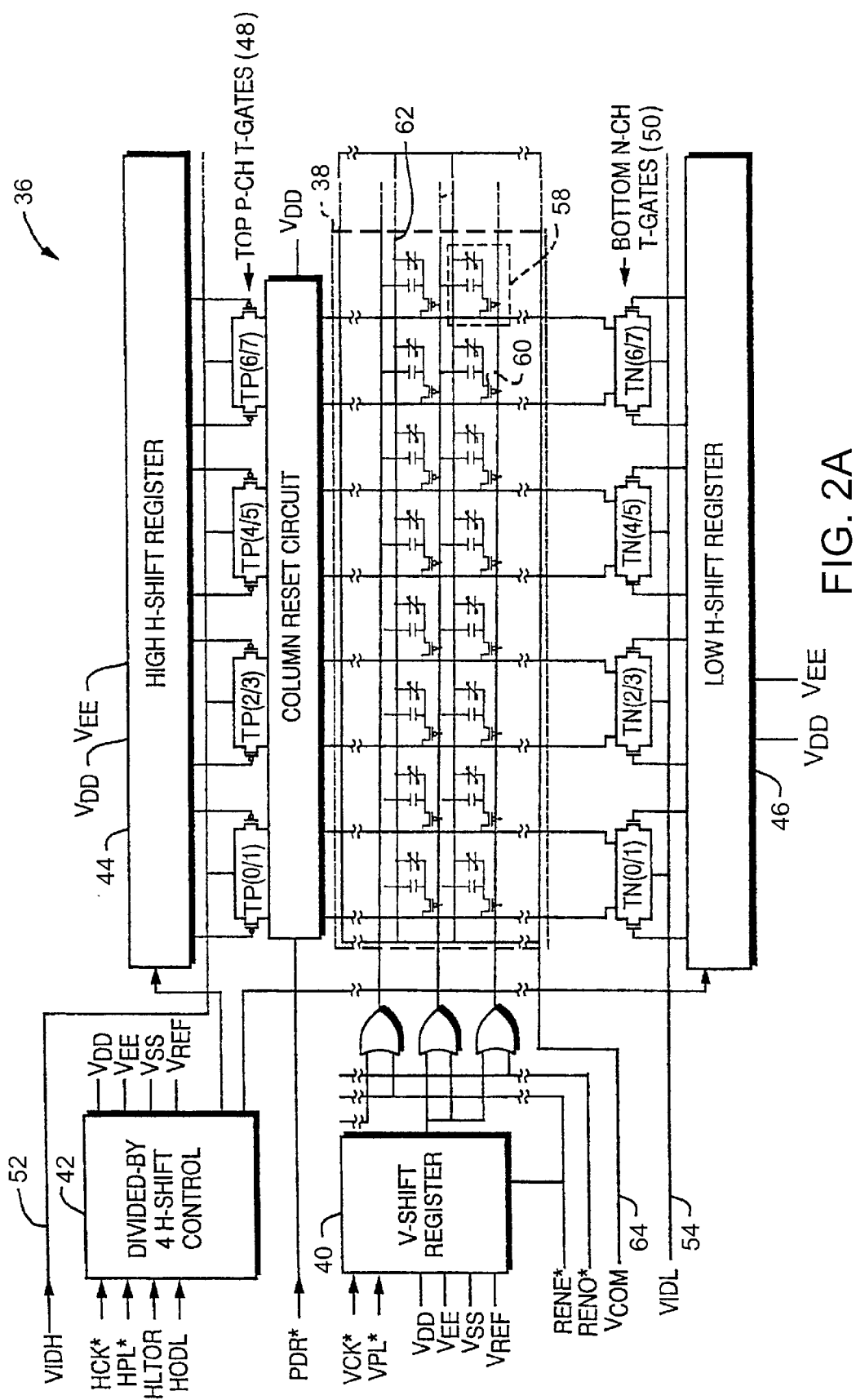
FIG. 2A is a schematic illustration of a die for an integrated active matrix panel display which includes optional control signal circuitry therein.

An integrated circuit active matrix display die 36 is shown schematically in FIG. 2A. The circuit 36 has been diced from a single wafer 32 along with selected number of replicated circuits. Incorporated into the circuit 36 are a display matrix circuit 38, a vertical shift register 40, a horizontal shift control 42, a pair of horizontal shift registers 44 and 46, and a plurality of transmission gates 48 and 50.

A video signal high line 52 and a video signal low line, 54 carry analog video signals from a digital to analog amplifier to the transmission gates 48 and 50. The transmission gates 48 and 50 are located above and below the display matrix circuit 38 as seen in FIG. 2A. The transmission gates above the display matrix circuit are p-channel transmission gates 48 and are connected to the video high (VIDH) line 52. The transmission gates below the display matrix circuit are n-channel transmission gates 50 and are connected to the video low (VIDL) line 54.

The transmission gates 48 and 50 are controlled by horizontal shift registers 44 and 46, with the p-channel transmission gate 48 controlled by a high horizontal shift register 44 and the n-channel 50 by a low horizontal shift register 46. The horizontal shift registers 44 and 46 are controlled by the horizontal shift control 42. The horizontal shift registers 44 and 46 select which column the video signal is sent.

The display matrix circuit 38 has a plurality of pixel elements 58. (e.g., 76800 pixel elements are in a 320×240 display). Each pixel element has a transistor 60 and a pixel electrode 62. The pixel electrode 62 works in conjunction with a counterelectrode 64, and the liquid crystal forming the pixel capacitor for creating the image.

The vertical shift register 40 selects the row. The row line from the vertical shift register 40 is connected to the base of each of the transistors 60 to turns on the pixels of the row. The column which has been selected by the horizontal shift register receives the signals and drives the liquid crystal or allows the liquid crystal of the pixel element to relax.

It is recognized that in larger arrays, such as 480×320, 640×480, and 1280×1024, it may be desirable to split the display in sectors and drive individual sectors independently. A description of a display with multiple channel driver is described in U.S. patent application Ser. No. 08/942,272 filed on Sep. 30, 1997 and titled "Color Display System for a Camera", the entire contents which is incorporated herein by reference.

Figure 2B:
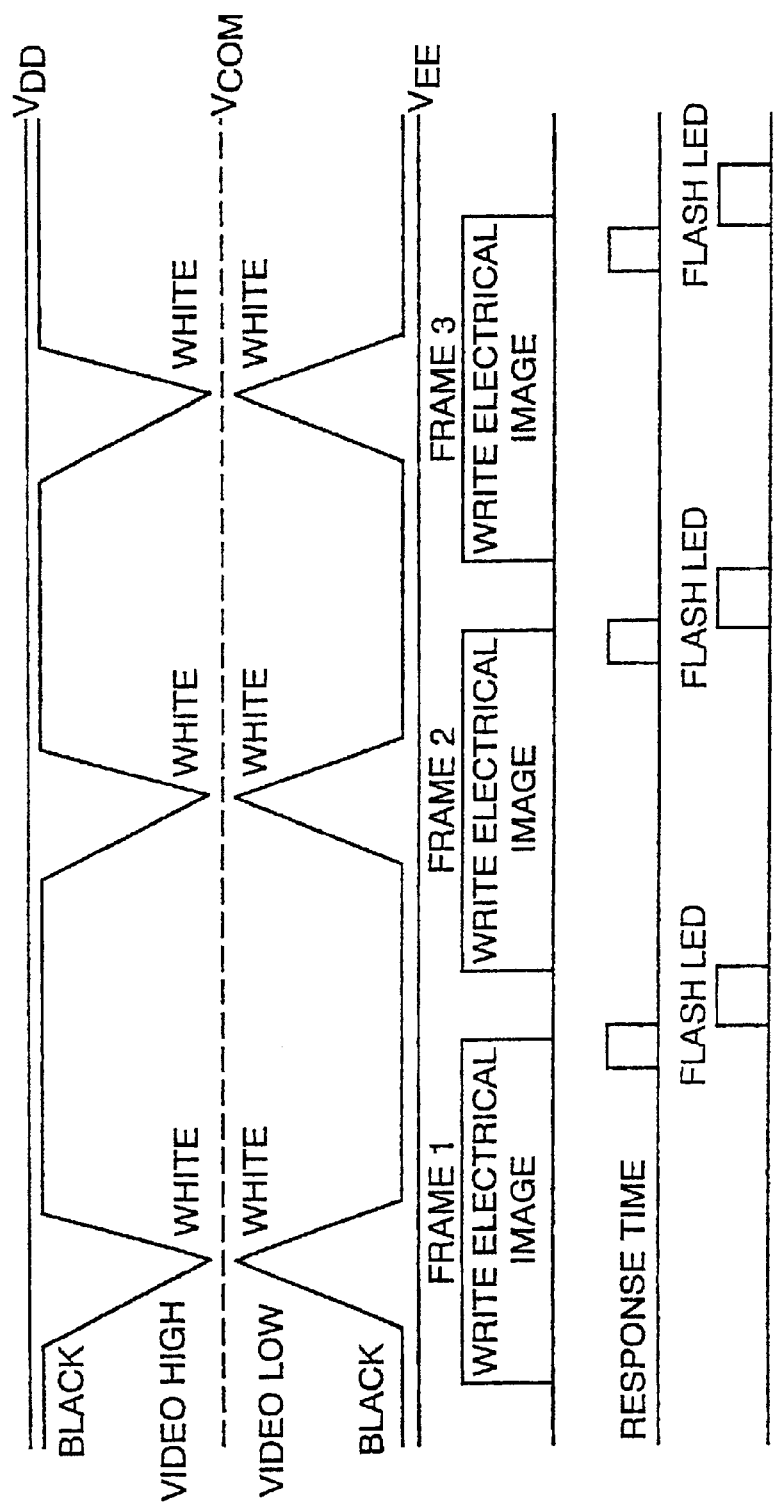
FIG. 2B illustrates a timing diagram for the display control circuit illustrated in FIG. 2A.

FIG. 2B illustrates a timing diagram for a a microdisplay. The video signal is sent to the display 36 both as actual video and inverted video. The p-channel transmission gates 48 receive actual video and the pixels supplied by these gates are driven between the common voltage ($V_{COM}$), the voltage applied to the counterelectrode, and the supply voltage source ($V_{DD}$). The n-channel transmission gates 50 receive the inverted video and the pixels supplied by these gates are driven between $V_{COM}$ and the supply voltage sink ($V_{EE}$). After the entire frame is scanned into the display and there is a delay to allow the liquid crystal to twist, the backlight is flashed to present the image. In a preferred embodiment, $V_{DD}$ is 9 volts, $V_{EE}$ is 2 volts and $V_{COM}$ is 5.5 volts. The technique of alternating the video on each column is called column inversion and helps prevent a DC voltage from building up on the liquid crystal material and additionally prevents cross talk.

These small high resolution displays require magnification such that when held in a user's hand within the range of 0.5 inches to 10 inches of the user's eye, a clear image is provided.

Figure 3B:
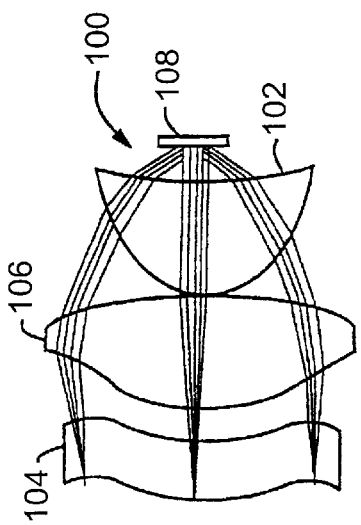
FIG. 3B is a side view of a multi element lens providing an increased field of view.
Figure 3C:
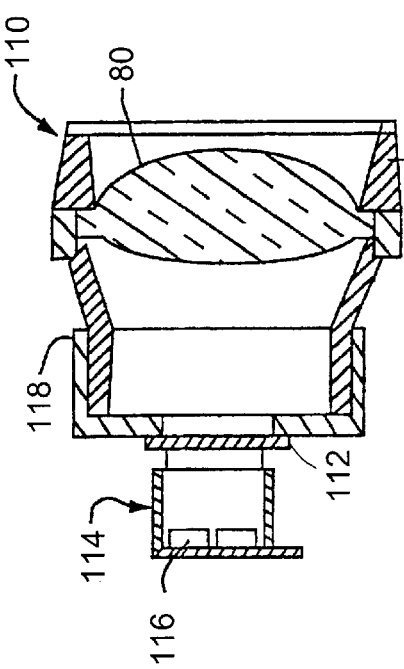
FIG. 3C is a cross-sectional view of a display assembly with a fixed lens.
Figure 3A:
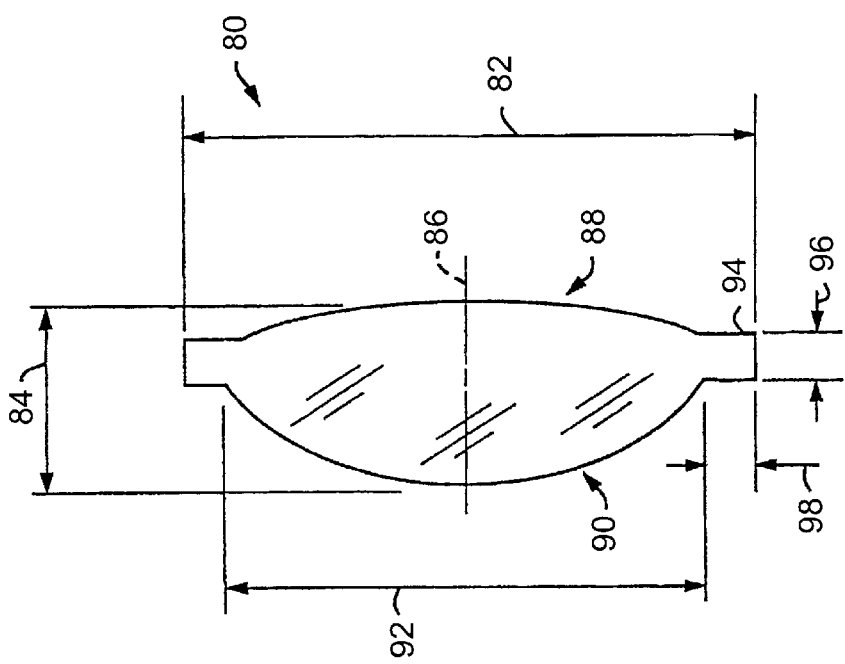
FIG. 3A is a side view of a lens suitable for magnifying a microdisplay in accordance with the invention.

A lens 80 suitable for magnifying the image of a microdisplay for viewing by a user is illustrated in the example of FIG. 3A.

For a 0.25 inch diagonal microdisplay, the outer diameter 82 of the lens can be about 30.4 mm, the thickness 84 of the lens at the optical axis 86 can be about 8 mm, the inner surface 88 that receives light from the display has a curved diameter of about 21.6 mm, and the viewing surface 90 has a diameter 92 of about 22.4. The peripheral edge 94 used to hold the lens 80 in the assembly can have a thickness 96 of about 2 mm and a radius 98 of about 4 mm. The lens 80 can be made of glass or a plastic material such as acrylic. This particular example of such a lens has a 16 degree field of view and an ERD of 25. The lens assembly can include an automatic focusing system, or a lens system that collapses in size when not in use.

Another preferred embodiment of a 1.25 inch diameter lens system 100 with a larger field of view is illustrated in FIG. 3B. Three lens elements 102, 104 and 106 enlarge the image on the display 108.

The lens 80 of FIG. 3A can be used in the display assembly of 110 of FIG. 3C. In this embodiment, the display 112 is positioned between the backlight housing 114, containing LED 116, and the lens housing 118 that holds the lens 80 in a fixed position relative to the display 112.

Other preferred embodiments of optical systems for color displays are described in application U.S. Ser. No. 08/565,058 filed on Nov. 30, 1995, the entire contents of which is incorporated herein by reference. Additional details on optical systems for color displays are described in PCT Application Serial No. U.S. 97/20171 filed on Oct. 31, 1997 of Jacobsen et al. and titled "MICRODISPLAY FOR PORTABLE COMMUNICATION SYSTEM" the content of which is incorporated herein in its entirety be reference.

The configuration of the display for a monochrome or a color sequential display is generally the same with the same pixel pitch or size. This is in contrast to other types of color where there is an individual pixel for each of red, green and blue. In a monochrome display a single light source is required, wherein in a color sequential display there are three distinct light sources (e.g., red, green and blue). In that there are three distinct colors, each color must flash in order to produce most images, in contrast to one flash for monochrome.

In sequential color displays, the display panel is triple scanned, once for each primary color. For example, to produce color frames at 20 Hz, the active matrix must be driven at a frequency of 60 Hz. However, in order to reduce flicker it is desirable to drive the active matrix to have a frame rate of 60 frames per second, since at over 60 Hz, visible flicker is reduced. In a color display a preferred frame rate is 60 frames per second which results in 180 sub-frames per second, in that each frame has a red, a blue and a green sub-frame. In contrast in a preferred embodiment for monochrome, the frame rate is 72 frames per second. It is thus recognized that while a display for a color sequential display is substantially similar to one for a monochrome display, the sub-frame rate needs to be substantially faster to achieve the desired results in color sequential.

The following describes a method of manufacturing a display for color sequential. While the display is for color sequential.and the fast frame rates, there is nothing that would limit its use for monochrome at a slower, frame rate.

Figure 4:
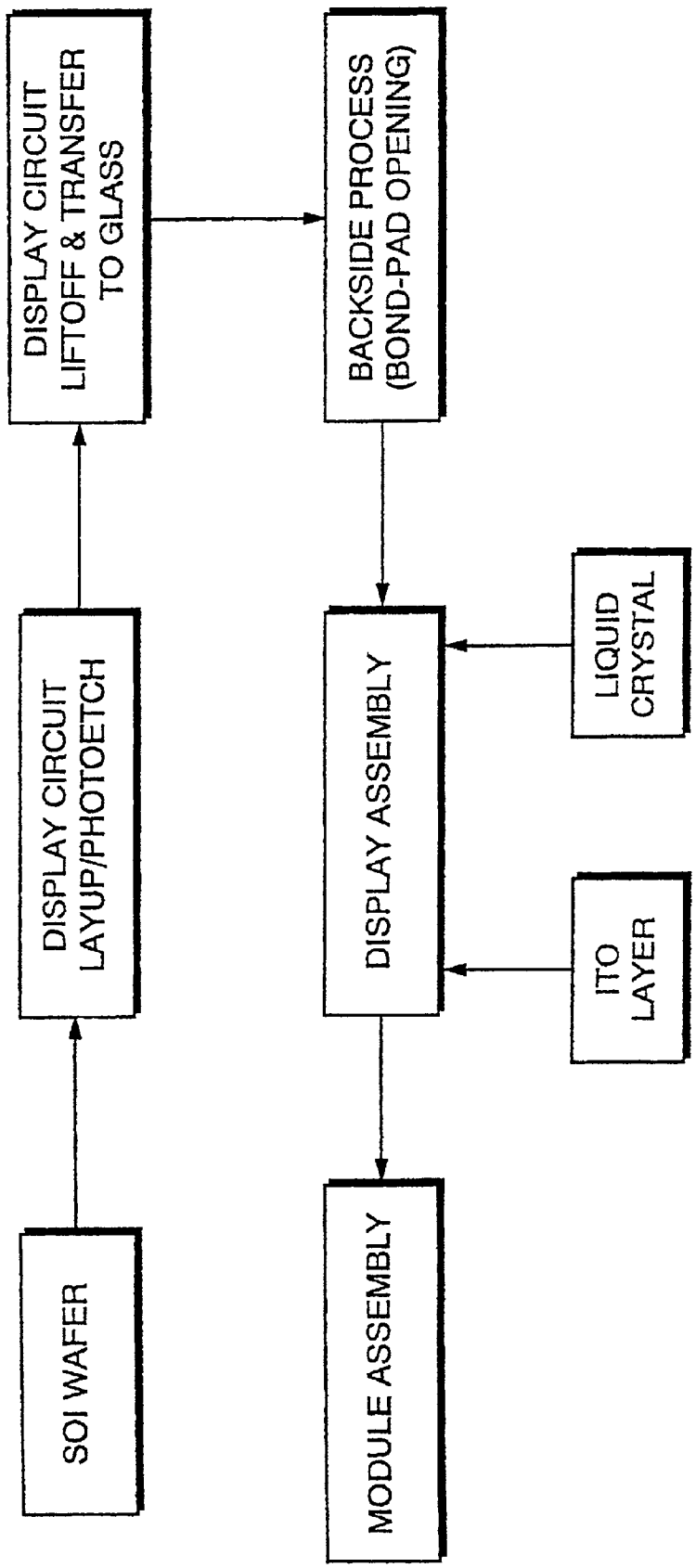
FIG. 4 is a schematic of the process.

The microdisplay is assembled in several major assemblies wherein in each assembly may have several steps. Referring to FIG. 4, a SOI (Silicon on Insulator) wafer has the integrated circuit laid upon the wafer. The display circuit is lifted off the wafer and transferred to the glass. The backside of the display circuit is processed. In addition to the display circuit, an ITO (Indium Tin Oxide) wafer having the counterelectrode is manufactured. The display circuit, the ITO wafer and the liquid crystal are assembled in a display assembly. The display assembly is assembled into a module assembly.

Figure 5A:
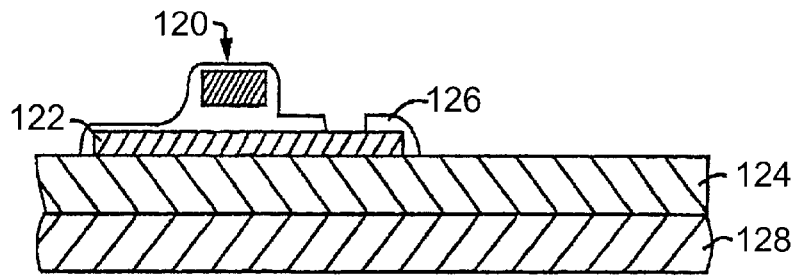
FIGS. 5A–5D are a schematic of the process of making the circuit on the TFT layer.
Figure 5B:
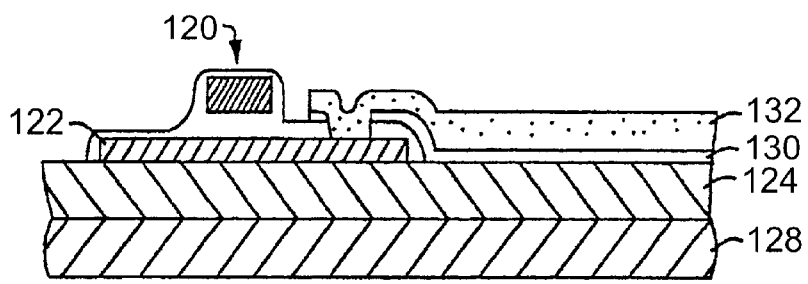

The forming of the circuitry 119 is illustrated in FIGS. 5A–5D. A transistor 120 in an active matrix circuit has been formed with a thin film single crystal silicon layer 122 over an insulating substrate 124 as seen in FIG. 5A. A thermal oxide 126 also overlies a portion of the single crystal silicon layer 122. The insulating substrate 124 is carried by a Silicon (Si) wafer 128. A layer of $Si_3N_4$ 130 is formed as an anti-reflection layer over the insulating substrate 124 and the thermal oxide 126 as illustrated in FIG. 5B. A poly-silicon electrode (the pixel electrode) 132 is formed over the $Si_3N_4$ layer 130 and in contact with the thin film single crystal silicon layer 122.

Figure 5C:
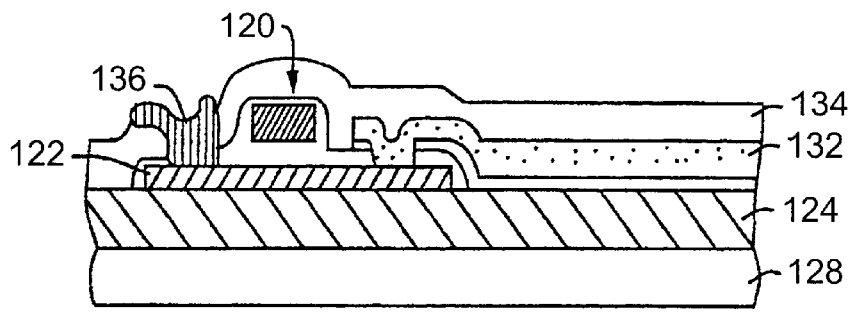
Figure 5D:
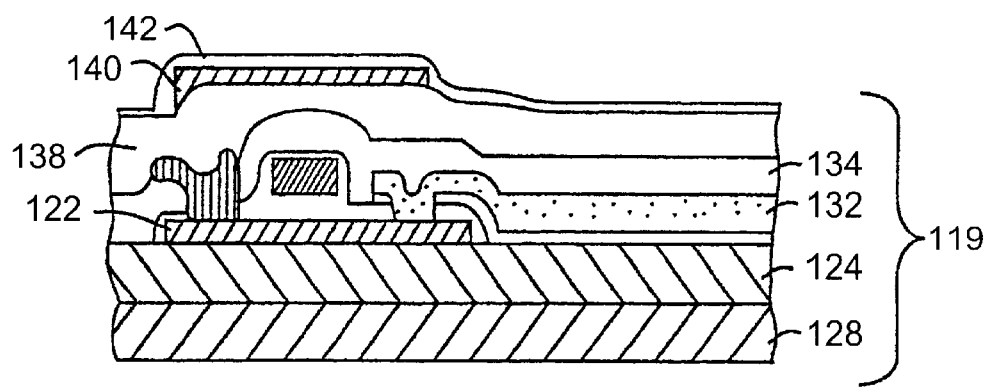

Referring to FIG. 5C, a BPSG 134 of $SiO_2$ is formed over the circuit. A portion is etched away and an aluminum terminal 136 is added. Referring to FIG. 5D, a layer of PSG 138 of $SiO_2$ is formed over the BPSG 134 and the aluminum terminal 136. A titanium (Ti) black matrix 140 is located over the transistor as a light shield. A silica passivation 142 is formed over the entire wafer. The wafer is ready for the next assembly process.

Figure 6:
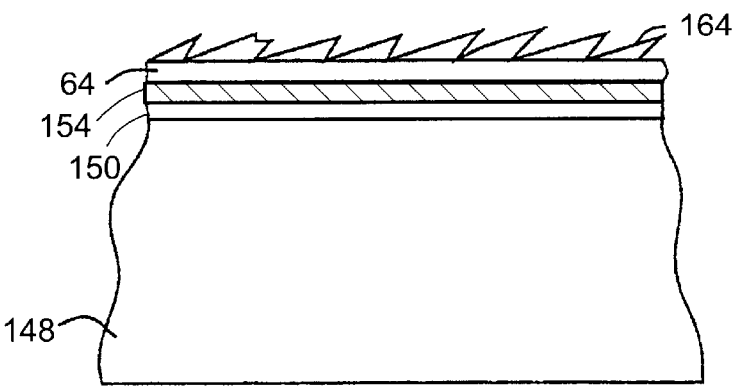
FIG. 6 is a cross-sectional view of an ITO layer.

In a separate process, the ITO wafer 146 having a counterelectrode 64 is formed. FIG. 6 illustrates the ITO wafer having a layer of glass 148, and the counterelectrode 64 (an ITO layer). In a preferred embodiment, interposed between the layer of glass 148 and the counterelectrode 64 is a second ITO layer 150 adjacent to the glass for heating as described below and a $SiO_2$ layer 154 between the two ITO layers 64 and 150.

Figure 7:
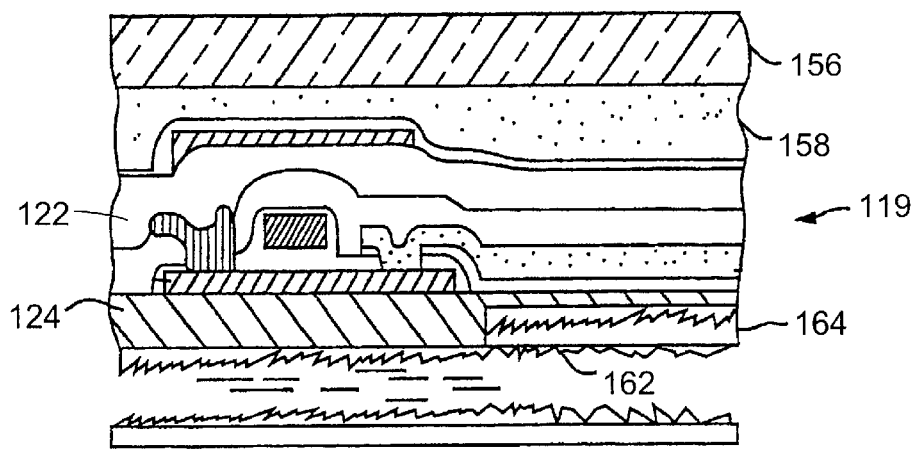
FIGS. 7 and 7A are cross-sectional views of a TFT layer with pooled buried oxide layer.
Figure 7A:
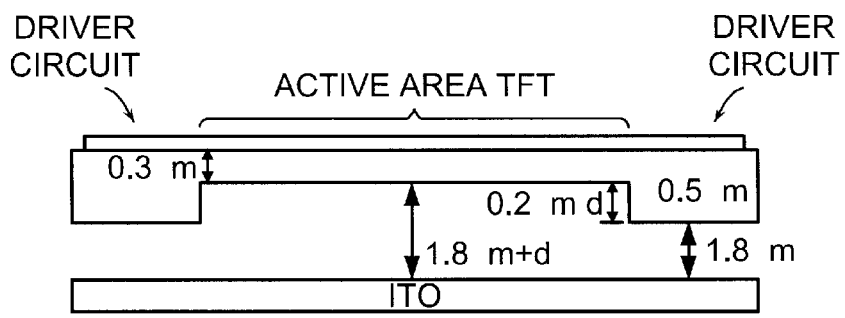

With the circuitry formed and the ITO wafer 146 formed, the two are ready to be joined together. The circuitry device 119 is then transferred to an optically transparent substrate 156 as shown in FIG. 7. A transparent adhesive 158 as described in greater detail in U.S. Pat. No. 5,256,562, the contents of which are incorporated herein by reference, is used to secure the circuit to the substrate 156. The layer, Si Wafer 128 to which the insulating substrate was initially attached, is removed.

The insulating substrate 124, also referred to as a buried oxide layer, is etched over the pixel arrays 132 as illustrated in FIG. 7. The buried oxide layer not located over the pixel arrays is left, therein creating a series of pools 162. In a preferred embodiment, the buried oxide layer is 0.5 µm and thinned by 0.2 µm to 0.3 µm in the pool areas over the pixel arrays. By only thinning the pixel arrays, the applied voltage to the liquid crystal is increased without compromising back-gate effect to the transistors (TFTs).

An alignment layer 164 of $SiO_x$ is deposited on the buried oxide and the counterelectrode illustrated in FIGS. 6 and 7. The alignment layer aligns the liquid crystal as described below.

Figure 8:
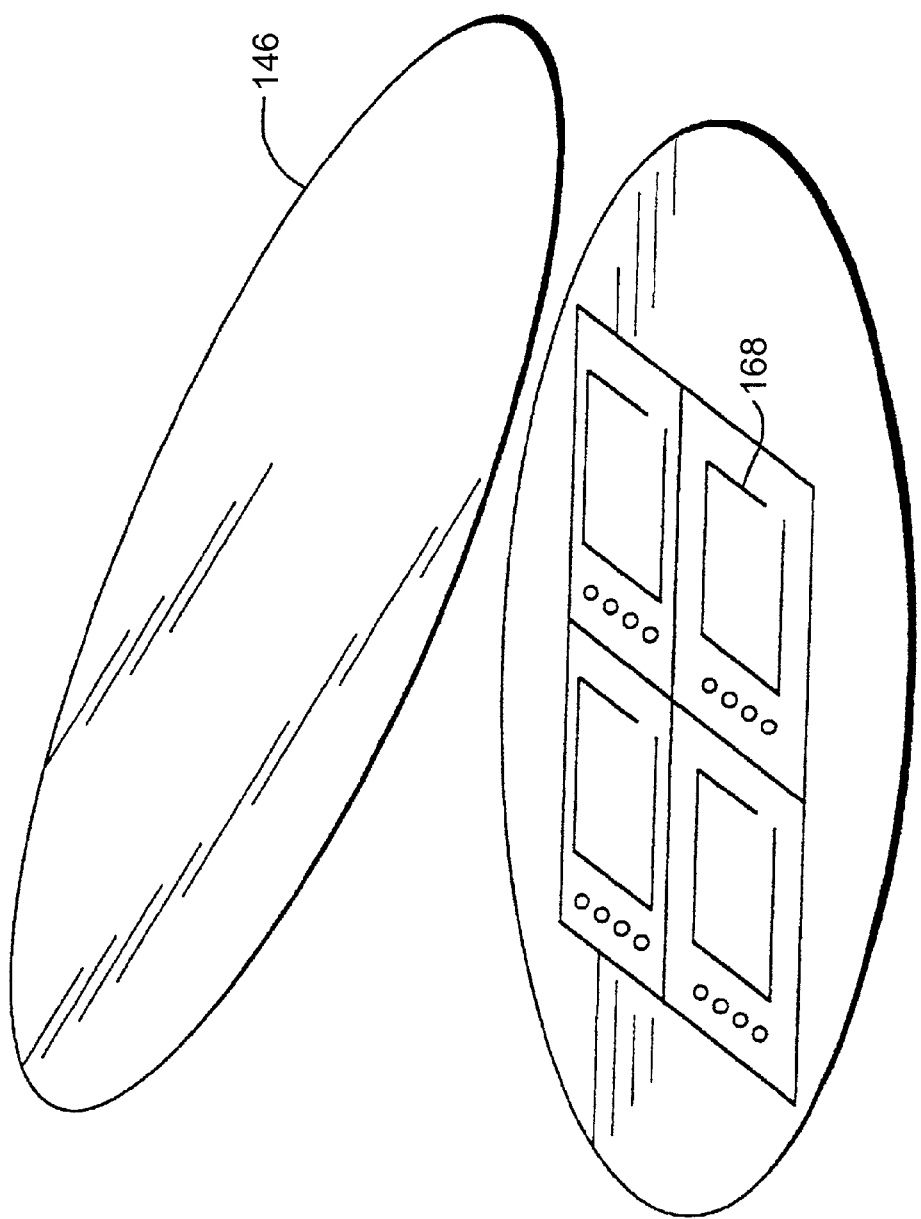
FIG. 8 is an exploded view of the ITO layer and the TFT layer prior to assembly.

A frame adhesive is placed around each display area as illustrated in FIG. 8. In addition, a silver paste is located in one spot on each display, so that the counter electrode is connected to the circuit when joined. A fill hole is left for filling the liquid crystal, as described below. The frame adhesive has a plurality of spacer balls. The spacer balls are 3–4 µm in diameter. The TFT glass and the counterelectrode glass are pressed together. The spacer balls ensure that the layers are spaced 1.8 µm apart when the bonding pressure is asserted. There are no spacers in the active matrix area. The combined wafers are then cured.

Figure 9:
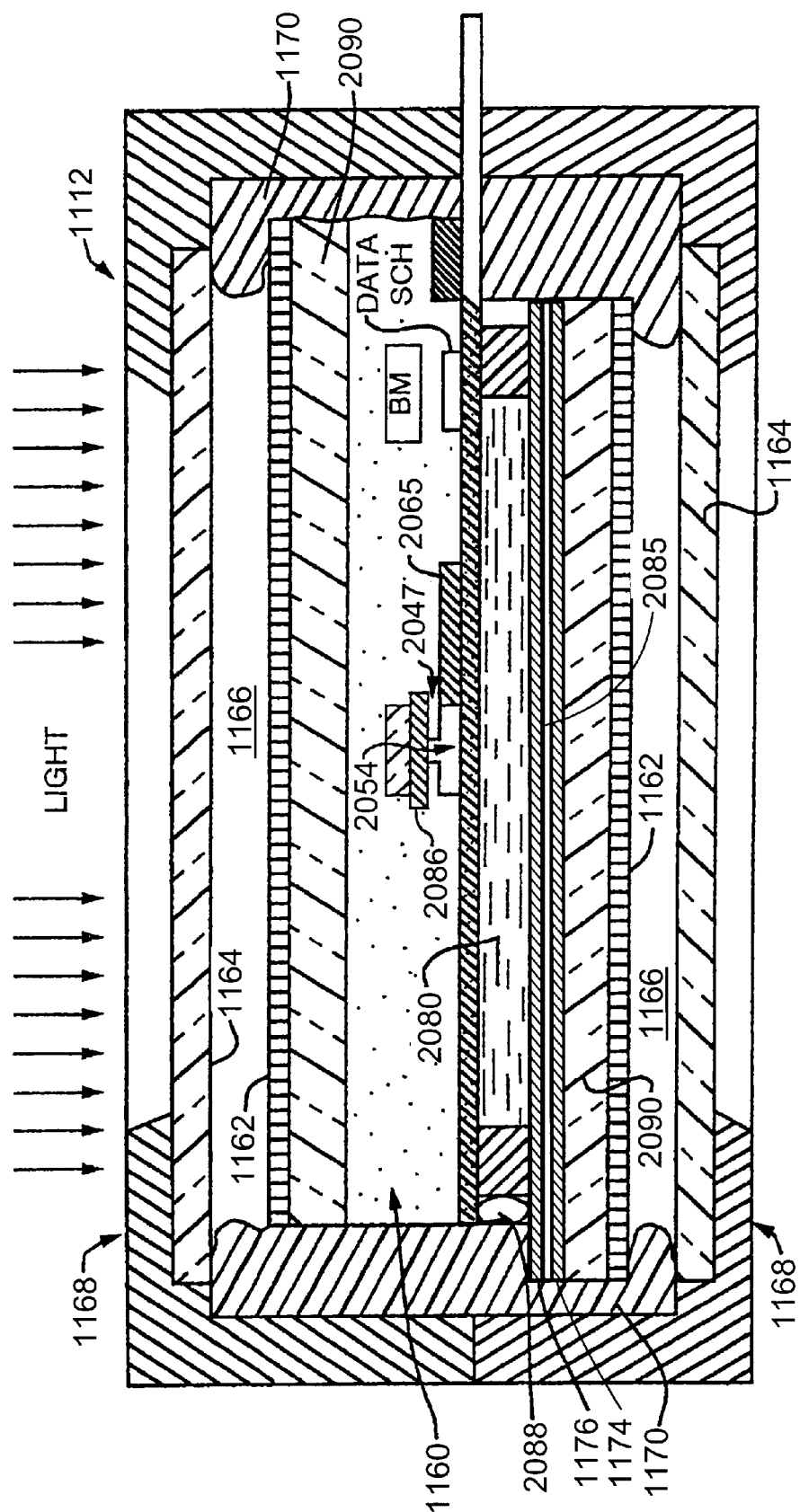
FIG. 9 is an enlarged sectional view of the display in its housing.

After curing, the glass on either side is scribed and broken. The two glass layers are broken at two different locations as illustrated in FIG. 9. The staggering of the break is to facilitate pin connection as described below.

The individual displays are placed in a holding tray and dipped into liquid crystal to fill the space between the buried layer and the counterelectrode as illustrated in FIG. 8. The liquid crystal is located between the alignment layers. The fill hole is then filled. That is the final step of the display assembly.

The module assembly consists of attaching the flex cable, the polarizers and mounting them into a module. Referring back to FIG. 9, a sectional view of the display 1112 is shown. The display 1112 has an active matrix portion 1160 including a pixel element 2047 spaced from a counterelectrode 2085 by an interposed liquid crystal material 2080. Each pixel element 2047 has a transistor 2054 and a pixel electrode 2065. The active matrix portion 1160 can have aluminum light shields 2086 to protect the transistor (TFT) 2054 if the active matrix is used for projection requiring high luminance light. The counterelectrode 2085 is connected to the rest of the circuit by solder bumps 2088. The matrix 1160 is bounded by a pair of glass substrates 2090 in this embodiment and a pair of polarizers 1162. An additional pair of glass plates 1164 are located outboard of the active matrix portion 1160. The glass plates 1164 are spaced from the polarizer 1162. The space defines an insulation layer 1166. The display 1112 includes a two-piece case 1168 which contains the active matrix portion 1160, the glass plates 1162 and the polarizers 1164. A room temperature vulcanization (RTV) rubber 1170 helps in maintaining the elements in the proper position in the case.

In order to get the liquid crystal to respond more quickly, the distance between the counterelectrode and the oxide layer is 2.0 µm at the pools 162. The narrow distance between the two elements results in less liquid crystal that has to twist to allow light to pass. However, the narrowing of the distance results in additional problems including the viscosity of some liquid crystals making it difficult to fill the display.

There are many characteristics that must be taken into account in selecting the desirable liquid crystal. Some characteristics include the operational temperature range the birefringence (delta $n=n_e-n_o$), the operational voltage, viscosity and resistivity of the liquid crystal.

With respect to viscosity, flow viscosity and rotational viscosity are two areas that are examined. The preferred ranges are a flow viscosity of less than 40 cp and a rotational viscosity less than 200 cp in the temeperature range of 0° C. to 70° C.

Another characteristic that is examined in selecting a liquid crystal is delta n. The value of delta n depends on the cell gap and the liquid crystal pretilt angle at the two surfaces. The pretilt angle at the two surfaces is influenced by the alignment layer of $SiO_x$ deposited on the buried oxide and the counterelectrode. For a 2 µm gap a delta n of greater than 0.18 is preferred and a delta n of 0.285 is desired. For a large gap a different delta n would be required. For a gap of 5 µm a delta n in the range of 0.08 to 0.14 is desired.

In addition to viscosity and delta n (Δn), the liquid crystal's threshold voltage and the voltage holding rate are criteria to be examined when selecting a liquid crystal. In a preferred embodiment, the threshold voltage should be less than 1.8 volts and preferable approximately 1.2 volts. The voltage holding ratio should be greater than 99%.

Other characteristics that are desired are easy alignment and stability to UV and high optical intensity. If required, the delta n can be compromised in order to achieve a lower viscosity and lower operation voltage.

In a preferred embodiment, the liquid crystal chosen was a SFM (superfluoriated material). In a preferred embodiments, the liquid crystal selected was one of TL203 and MLC-9100-000 marketed by Merck.

Liquid crystal is formed of a chemical chain which extends from the two surfaces. The alignment layer of $SiO_X$ deposited on the buried oxide and the counterelectrode are oriented in a preferred embodiment at 90° to each other. The alignment layers give the liquid crystal a pre-alignment.

The chain of liquid crystal twists and untwists depending on the voltage to the associated pixel electrode. This twisting in relation to the polarization plates results in the liquid crystal going between a white or clear state and a dark state.

While depending on the relation of the liquid crystal and the polarization plates, the liquid crystal can either look clear or dark in the relaxed position and conversely dark or clear in the driven state. In a preferred embodiment, the liquid crystal looks clear in the relaxed position and dark in the driven state.

Referring back to FIG. 2A, the image is scanned into the active matrix display by the vertical shift register selecting the first row, by the row going low, and the horizontal shift register selecting column by column until the entire row has been written to. When the first row is done, the vertical shift register selects the second row. This continues until the last row is selected. The horizontal shift register select column by column until the last column in the last row has been written to. There is therefore a set time delay between when the first pixel (i.e., the first row, first column) and when the last pixel (i.e., the last row, last column) has been written. In a preferred embodiment, the delay from writing the first pixel to the last pixel is approximately 3 milliseconds.

Figure 10:
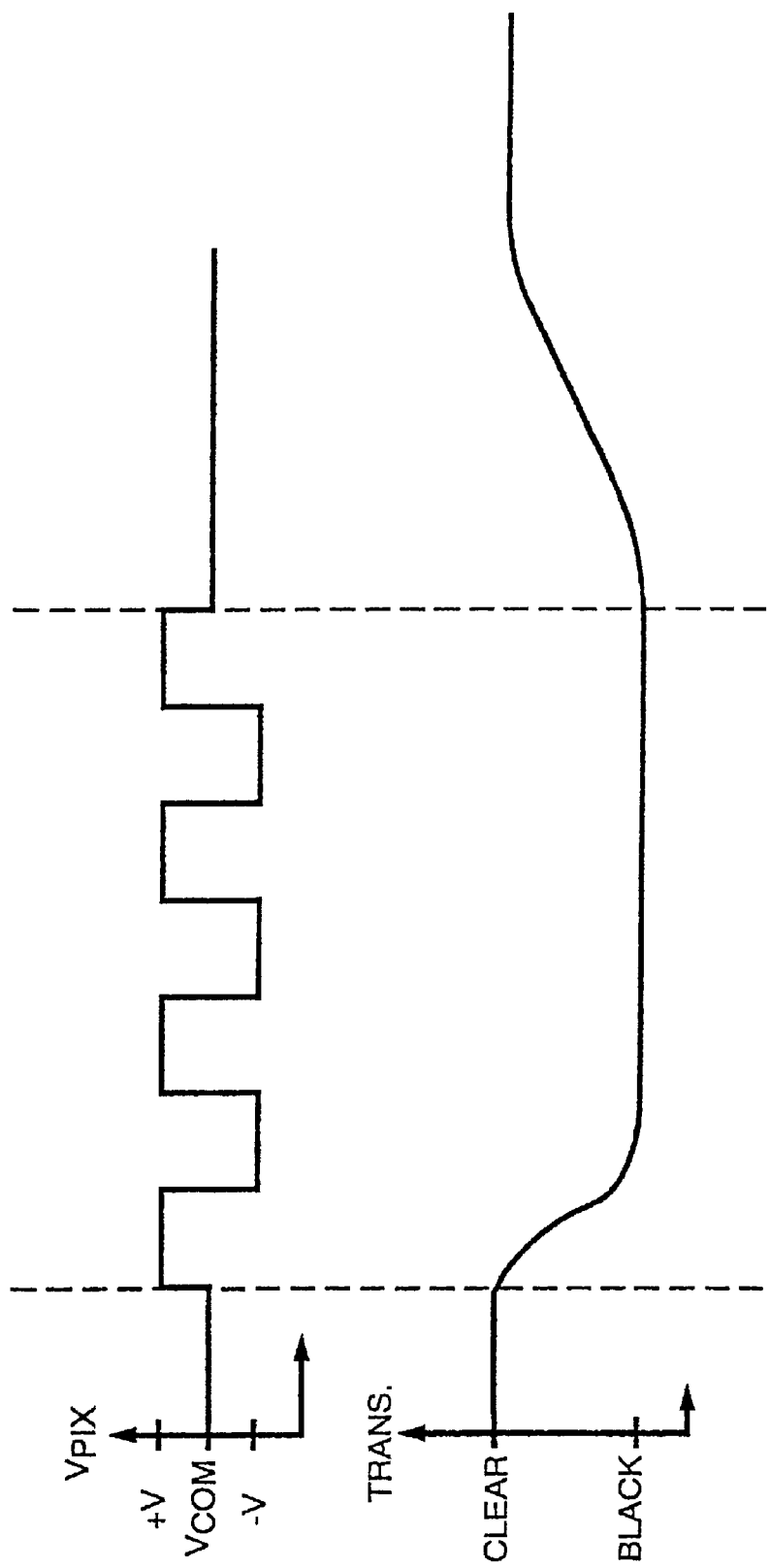
FIG. 10 is a graphical representation of time to turn the liquid crystal clear to black and black to clear.

As indicated above, the liquid crystal does not respond instantaneously to the change of voltage. The delay for the liquid crystal to respond is illustrated in FIG. 10. With Vpixel initially equal to $V_{COM}$, so there is no voltage drop, the liquid crystal, as seen through the polarizers, is clear. When V pixel goes to a voltage, the liquid crystal is driven black. The change is not instantaneous since it takes the liquid crystal a set time to rotate. This time is a function of several factors including the type of liquid crystal and the temperature. If after reaching the steady state black, Vpixel is set to $V_{COM}$, the liquid crystal returns to the clear state. Like the translation from clear to black, the change is not instantaneous. The change of state to clear takes longer than when the liquid crystal is being driven to black. FIG. 10 shows it takes over 2½ times as long to go from black to clear as it takes to go from clear to black. In a preferred embodiment using the preferred liquid crystal at room temperature, the time to drive from white to black is 4 milliseconds and the time for the liquid crystal to return to white is 10 milliseconds.

Figure 11A:
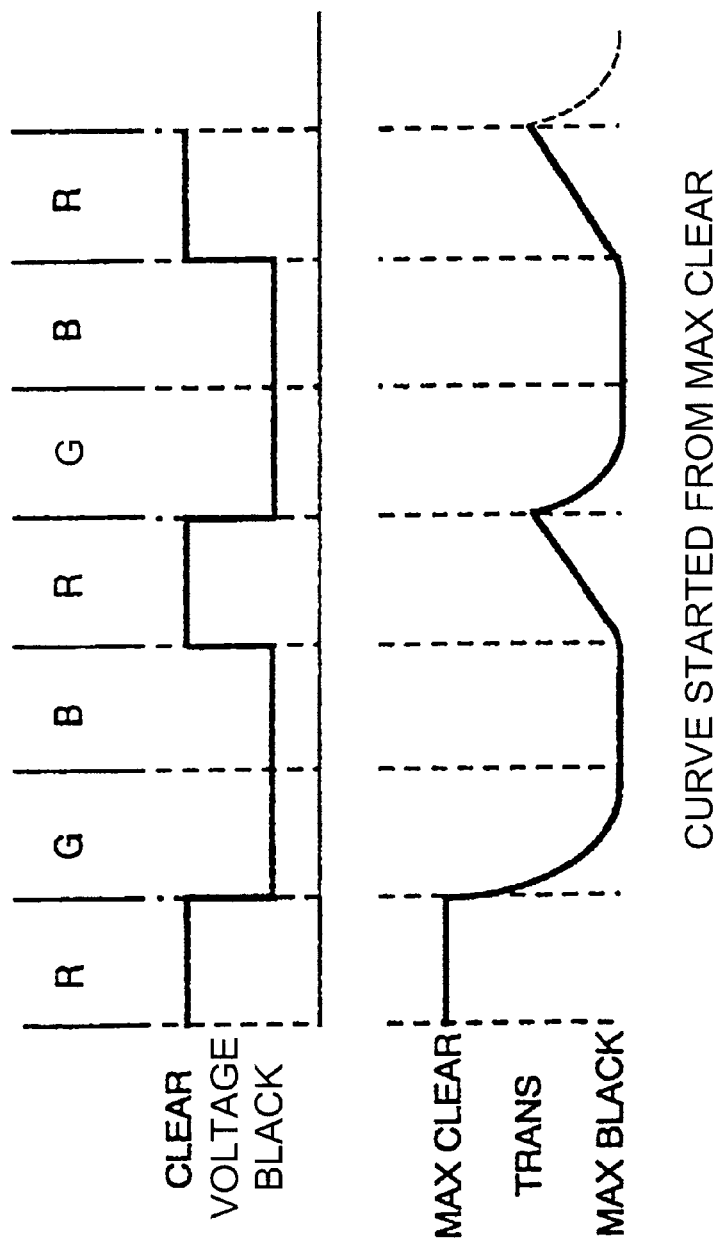
FIG. 11A is a graphical representation of the voltage and the transitioning of the liquid crytal for a pixel that is desired to be red.

As indicated above, in order for the color display to reduce flicker, there needs to be 180 subframes per second or less than 6 milliseconds per subframe. Therefore at 180 subframes per second, the liquid crystal cannot go from black to clear in a subframe. Referring to FIG. 11A, for a red pixel the voltage is $V_{COM}$ for the subframe which is associated with the red flash of light and another voltage, for the subframes which are associated with the green and the blue flashes. This is done with the desire that the liquid crystal associated with that pixel is clear for the red flash and black for the green and blue flashes therein producing a red pixel.

If the liquid crystal starts as clear in the first subframe, it is capable of being driven black in the next subframe, the subframe associated with the green flash. The display circuit continues to drive the liquid crystal black for the next subframe associated with the blue flash. When the display circuit for that pixel goes to $V_{COM}$, the liquid crystal is allowed to relax. However, the liquid crystal, as represented in the illustration, does not get to a clear state by the time the subframe is done. In the illustration shown in FIG. 11A, the liquid crystal only gets to about fifty percent (50%) clear. In the next subframe, the green subframe, the liquid crystal is driven black again. Therefore, the liquid crystal for this red pixel never gets to its completely clear state before the flash. A maximum contrast is never achieved.

With a color sequential display, even when the display is of a static image, the display is dynamic since the display is sequencing through the red image, the green image and the blue image.

Referring back to FIG. 2B, if the liquid crystal had a fast enough response to twist or untwist or if the subframe was a longer time period, even the last pixel written to, as represented by the end of the write box, would be settled in the final position before the flashing of the LED. However, the liquid crystal does not respond quickly enough to allow settling at the frame or subframe speeds required to prevent flicker as illustrated in FIG. 11A. In that the pixels are written to sequentially, the first pixel is written to (i.e., driven to twist or allowed to relax) a set time before the last pixel. In a preferred embodiment, the time between writing to the first pixel and the last pixel is approximately 3 milliseconds.

Therefore, the liquid crystal associated with the last pixel and the liquid crystal associated with the first pixel do not have the same amount of time to respond prior to the flashing of the backlight.

With the twist of the liquid crystal different at the two pixels, there is a different amount of light passing through the liquid crystal and therefore the contrast, the luminance, the color blend can vary from one corner to another of the display. For example, if a display had an intermediate color such as yellow at the first pixel and the last pixel, the color would not be identical.

Figure 11B:
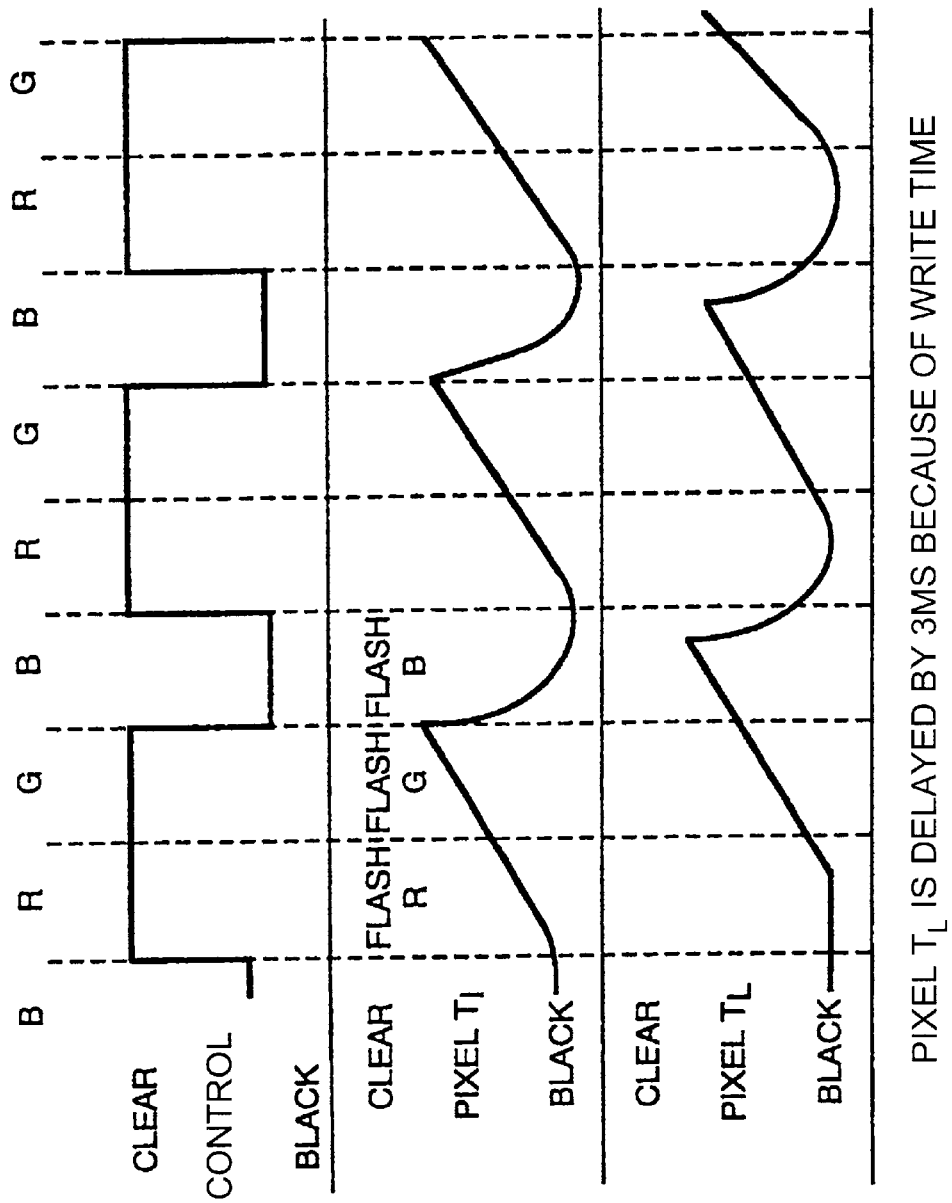
FIG. 11B is a graphical representation of the voltage and the transitioning of the liquid crystal for the first pixel and the last pixel for a intermediate color such as yellow.

Referring to FIG. 11B, a yellow pixel is created by allowing the red flash and the green flash to be seen and not the blue flash. The video for the pixel is set to drive the pixel black for the blue subframe and allow it to relax for the red and the green subframes, as represented by the square wave. In the first subframe in FIG. 11B, the blue subframe, the liquid crystal for both the first pixel and the last pixel are shown at a steady state black. The first pixel receives its signal at the beginning of the red subframe and the liquid crystal begins to relax. The last pixel receives its signal at some time later, 3 milliseconds in a preferred embodiment, and the liquid crystal begins to relax at that time. The liquid crystal related to the first pixel and the last pixel are at different points in the transition to clear when the red LED flashes, therein producing different levels of red. In the embodiment shown in FIG. 11B, the next color to flash is green and therefore the first and last pixels are not changed. Therefore the liquid crystal associated with both the first and the last pixel continues to transition to clear. When the LED for green flashes, the liquid crystal for the two pixels are in different points of transition to clear, therefore there is a different level of green. In addition, because the green flash occurred after the red flash and the liquid crystal had more time to transition, the amount of green that is visible is greater than the amount of red, therein resulting in a greenish yellow.

Still referring to FIG. 11B, the next subframe is the blue subframe. The pixels are driven black. The first pixel, once again receives its signal near the beginning of the subframe and in that in a preferred embodiment it takes 3 milliseconds for the liquid crystal to turn black, the liquid crystal is black before the flash of the blue LED. The last pixel receives its signal near the end of the subframe and is still transitioning to black when the blue LED flashes. Therefore, the last pixel in this subframe has some blue in its yellow.

In the next frame, the next red subframe, the liquid crystal is relaxing, therein turning to clear. The last pixel had been previously driven black, therefore as it, transitions to clear, the last pixel will once again lag behind the first pixel.

Figure 12A:
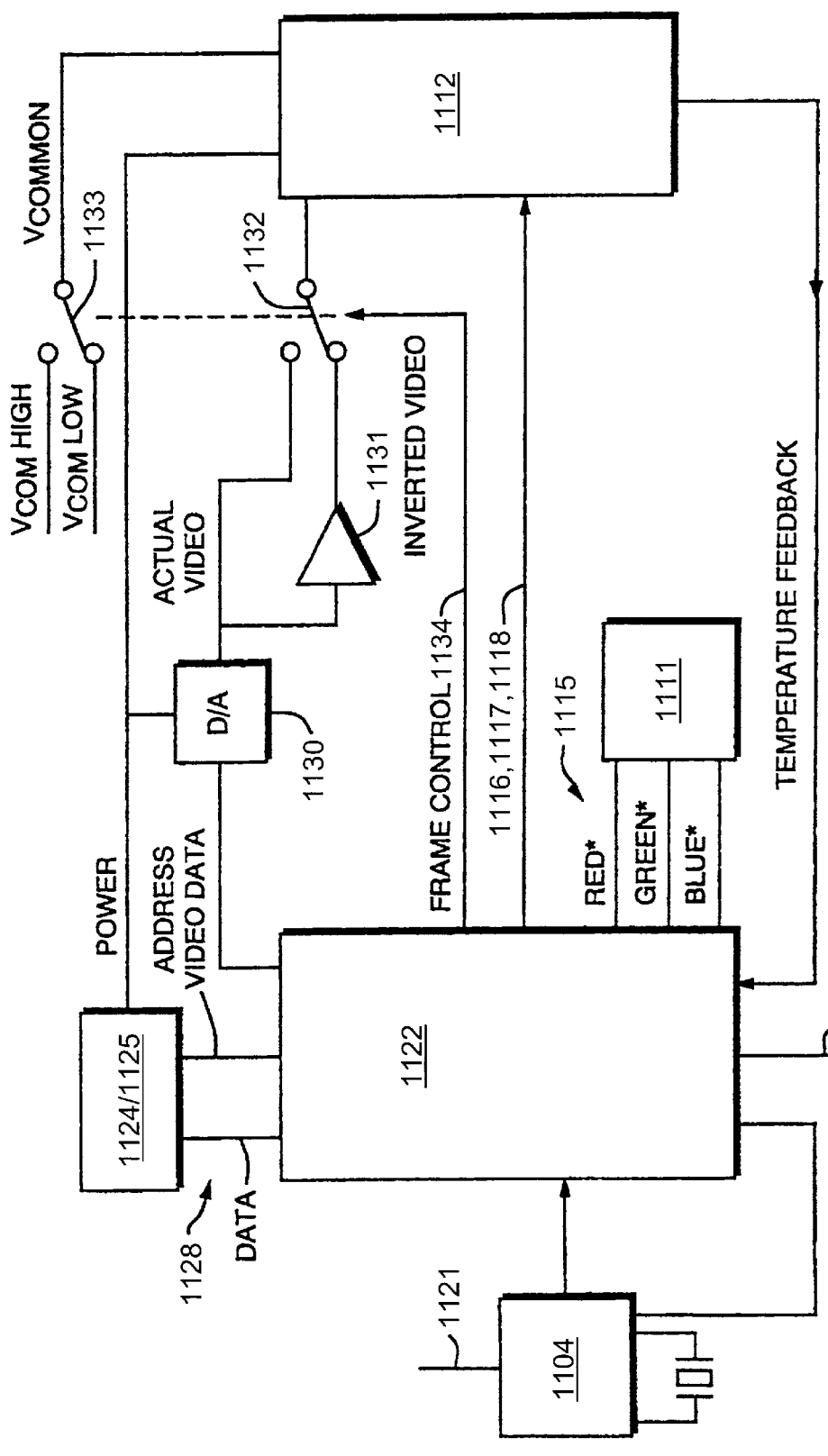
FIG. 12A illustrates an alternative preferred embodiment of the display control circuit in accordance with the invention.

FIG. 12A illustrates an embodiment of a display control circuit. In this embodiment, a digital circuit 1120 is used to control color sequential display operation. The processor 1104 receives image data at an input 1121 and sends display data to memory 1124 and flash memory 1125 via the timing control circuit 1122. The image data can be in a variety of forms including serial or parallel digital data, analog RGB data, composite data, or s-video. The processor 1104 is configured for the type of image data received, as is well known in the art. The timing control circuit 1122 receives clock and digital control signals from the processor 1104 and transmits control signals to the backlight 1111 along lines 1115. The timing control circuit 1122 transmits control signals, such as vertical start pulse, vertical clock, horizontal start pulse, and horizontal clock, to the display 1112 along lines 1116, 1117, and 1118. Lines 1128 direct ready, reset, write enable, output enable, color enable, address and data signals to memory to control delivery of image frames to the display 1112.

Still referring to FIG. 12A, the image data travels from the timing control circuit 1122 to the display 1112 through a digital to analog converter 1130 and through an inverter 1131 on an alternate frame dependent on a switch 1132 as described below. In addition and in contrast to the previous embodiment, the common voltage ($V_{COM}$) enters the display 1112 at alternating values controlled by a switch 1133. The switches 1133 and 1132 for alternating the $V_{COM}$ and, the video to the display are controlled by a frame control line 1134 from the timing control circuit 1122.

Figure 12B:
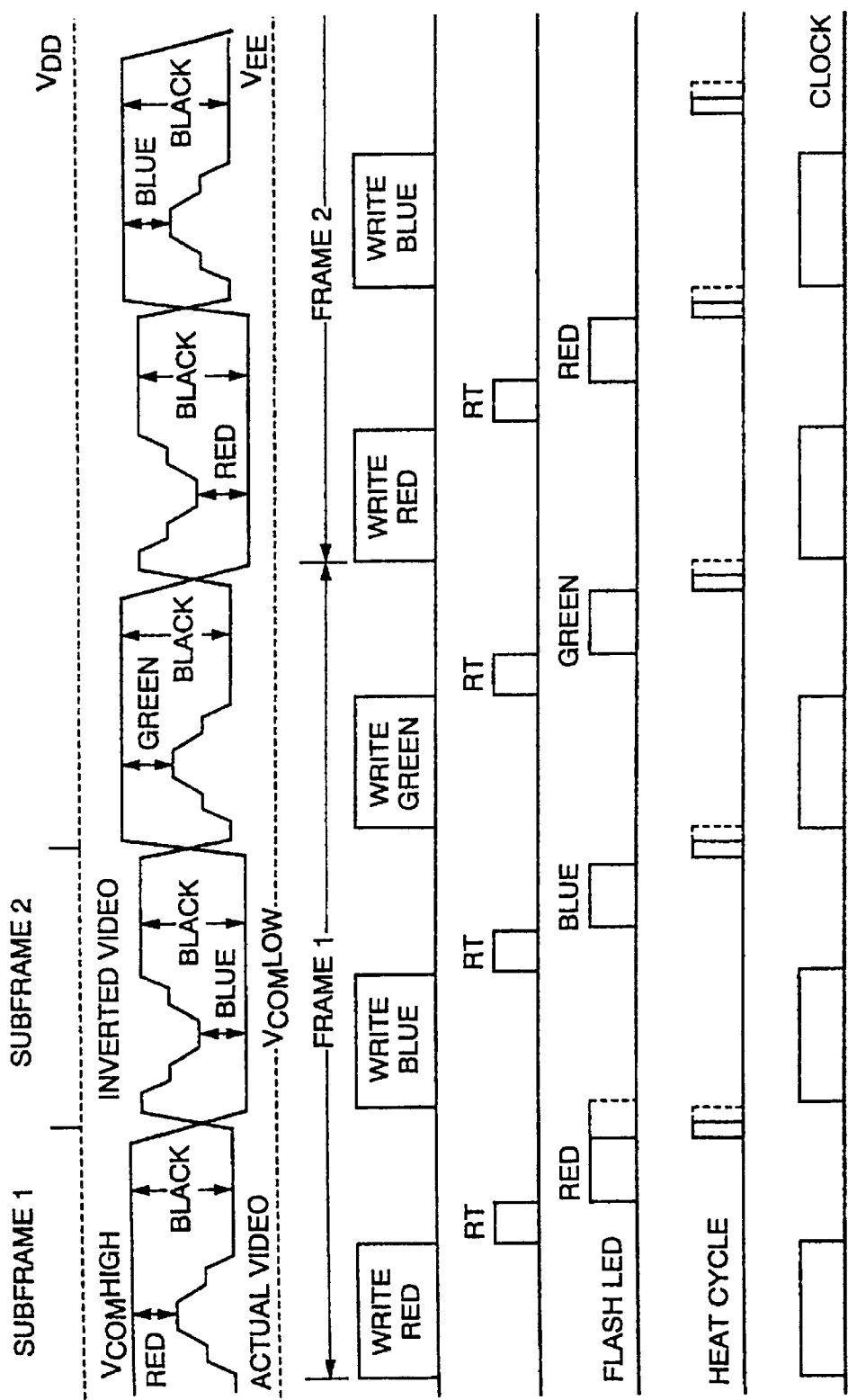
FIG. 12B illustrates a timing diagram for the display control circuit illustrated in FIGS. 12A.
Figure 12C:
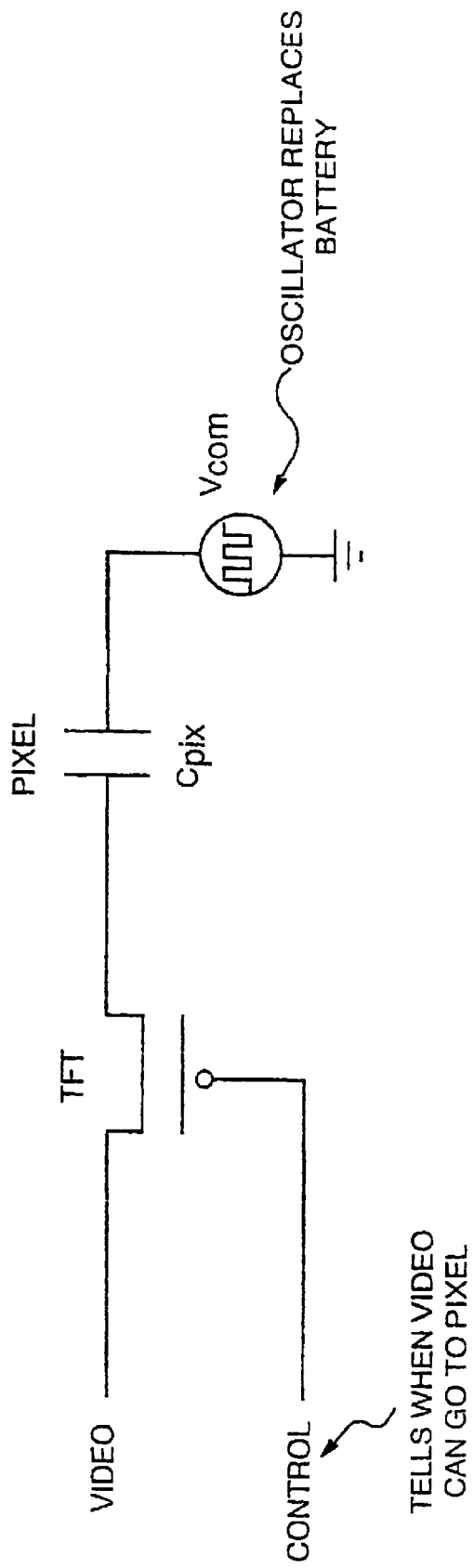
FIG. 12C illustrates a pixel element of the display control circuit shown in FIG. 12A.

Referring to FIGS. 12B and 12A, with the common voltage ($V_{COM}$) high, approximately 8 volts in a preferred embodiment, the actual video signal is scanned into the matrix circuit. After a delay to allow for the liquid crystal to twist to maximum position, the LED backlight 1111 is flashed to present the image. Prior to the next frame, subframe 2 in FIG. 12B, $V_{COM}$ goes low, approximately four (4) volts in a preferred embodiment. Driving $V_{COM}$ low erases the image that has just been scanned. However, since there is no backlight on, the loss of the image is not seen. With $V_{COM}$ low, the inverted video signal is scanned into the matrix circuit. Similarly, after a delay to allow the liquid crystal to twist, the LED backlight 1111 is flashed to present the refreshed or new image. Prior to the next frame, subframe 3 in the Figure, $V_{COM}$ goes high. Driving $V_{COM}$ high results in the image that has just been scanned to be erased. With $V_{COM}$ high, an actual video signal is scanned into the matrix circuit. A delay occurs and then the LED backlight 1111 is flashed. The common voltage ($V_{COM}$) and the video keep on alternating, as represented in FIG. 12C. If the display is a color display, the LED backlight 1111 sequentially flashes the distinct colors. In addition, three screen scans, one for each color LED, comprise a frame and the $V_{COM}$ alternates each screen.

In a preferred embodiment, $V_{COM}$ fluctuates every 5–6 milliseconds. It takes approximately 3 milliseconds to write/scan the image. The LED flashes for a time period of about 0.5 milliseconds. There is a waiting period between writing to the last pixel and the flash of about 1.5 milliseconds. It is recognized that it may be desirable to vary the delay time before flashing the LED or, vary the length of the LED flash dependent on the color LED to be flashed. For example, it may be desirable to have a longer delay time, response time, before flashing the LED when the LED to be flashed has a longer wavelength, such as red, which has a wavelength of between 630 and 700 nm.

With the video amplitude, the difference between $V_{DD}$ and $V_{EE}$, on the pixel's TFT reduced, a smaller storage capacitor is required. Less time is needed to write with a smaller storage capacitor and therefore a smaller pixel TFT can be used. If the liquid crystal has a fast enough response, the storage capacitor can be eliminated and the capacitance of the liquid crystal becomes the storage capacitor. In addition, with no storage capacitor a larger aperture is possible. With larger aperture and increased aperture ratio, the image will be brighter for the same cycling of the backlight or the total power used can be reduced with the same image brightness.

Figure 12D:
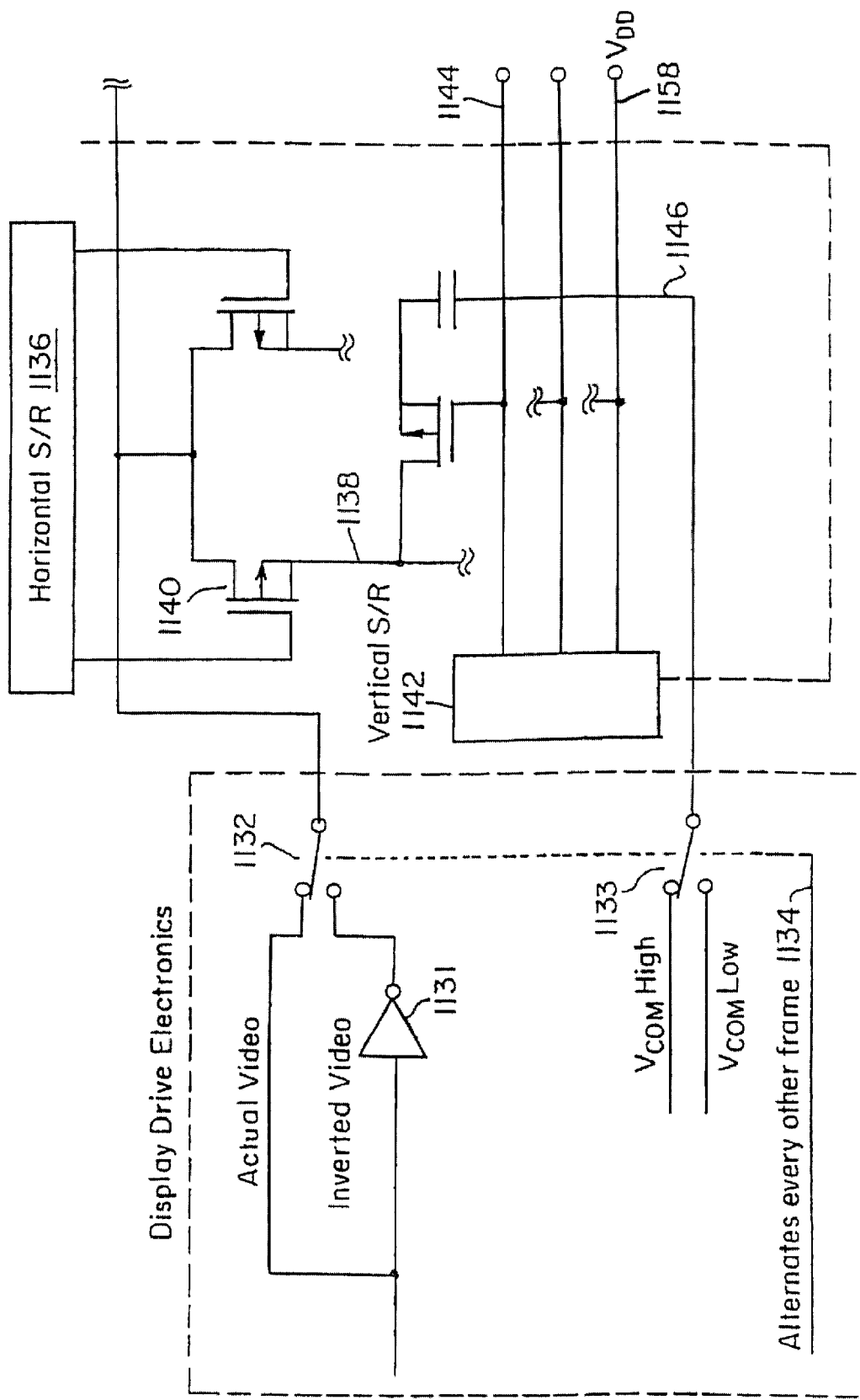
FIG. 12D illustrates a portion of the display control circuit shown in FIG. 12A

Referring to FIG. 12D, an enlarged schematic view of one pixel, the pixel is charged by the horizontal shift register 1136 selecting a column 1138 by turning a transmission gate 1140 and the vertical shift register 1142 selecting a row 1144. The video is written to the pixel and the liquid crystal begins to twist and become optically transmissive. After the entire display has been written and there has been a delay before the LED flashes, the $V_{COM}$ 1146, i.e., the voltage to the counterelectrode, is switched from high to low or vice versa by the frame control line. At the same time, the video signal is switched from actual video to inverted video or vice versa, so that the video will be switched for the next frame.

The liquid crystal can be twisted to become either optically transmissive or optically opaque. The orientation of the polarizers affect whether the liquid crystal is driven to white, transmissive, or to dark, opaque.

Figure 13:
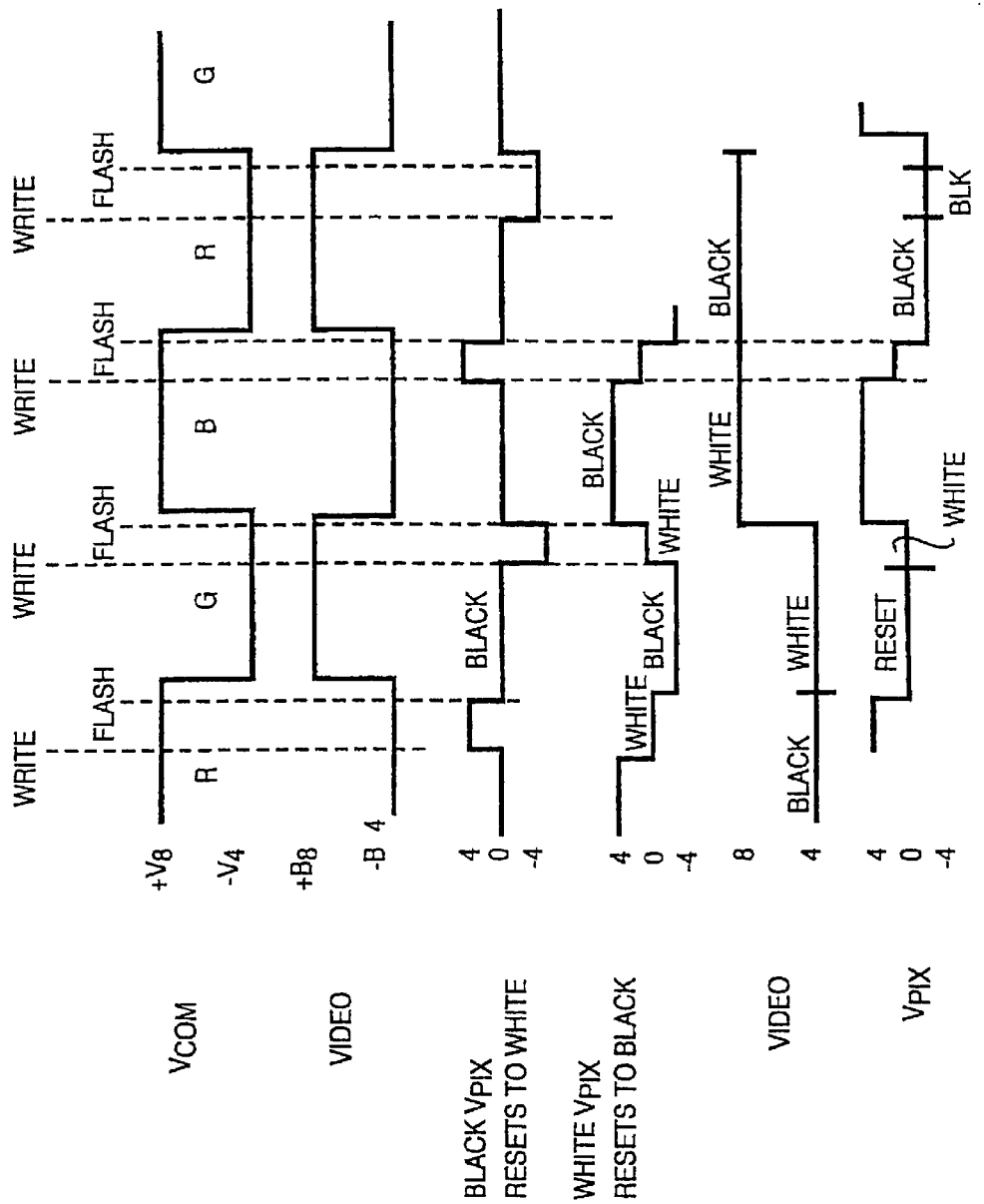
FIG. 13 is a graphical representation of the a black pixel being reset to white and white pixel being reset to black by the modulation of $V_{COM}$.

By switching $V_{COM}$ and the video signal after each frame or subframe as illustrated in FIG. 13, a black pixel is reset to white and a white pixel is reset to black. The resetting of the $V_{COM}$ changes the base or common ground voltage for the pixel. Therefore if $V_{COM}$ is 8 volts and the pixel is driven to 4 volts, a 4 volt differential results and the liquid crystal is black. If $V_{COM}$ is then set to 4 volts, there is no differential and the pixel is reset to white. Likewise if $V_{COM}$ is 8 volts and the pixel is allowed to go to $V_{COM}$, a zero (0) volt differential results and the liquid crystal twists to white, and then $V_{COM}$ is set to 4 volts, there is now a 4 volt differential and the pixel is reset to black.

Figure 14:
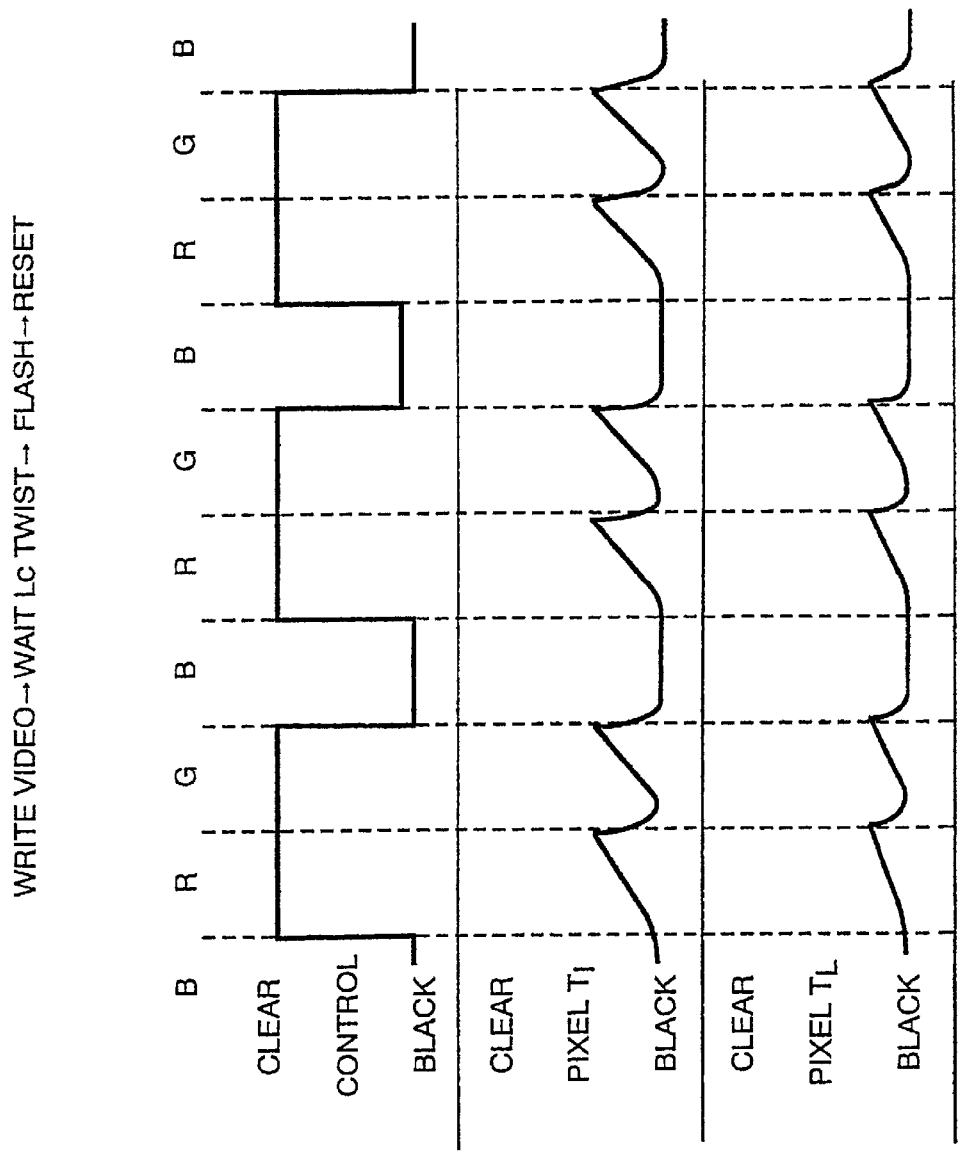
FIG. 14 is a graphical representation of the voltage and the transitioning of the liquid crystal for the first pixel and the last pixel for a intermediate color such as yellow for the display control circuit illustrated in FIGS. 12A–12C.
Figure 15A:
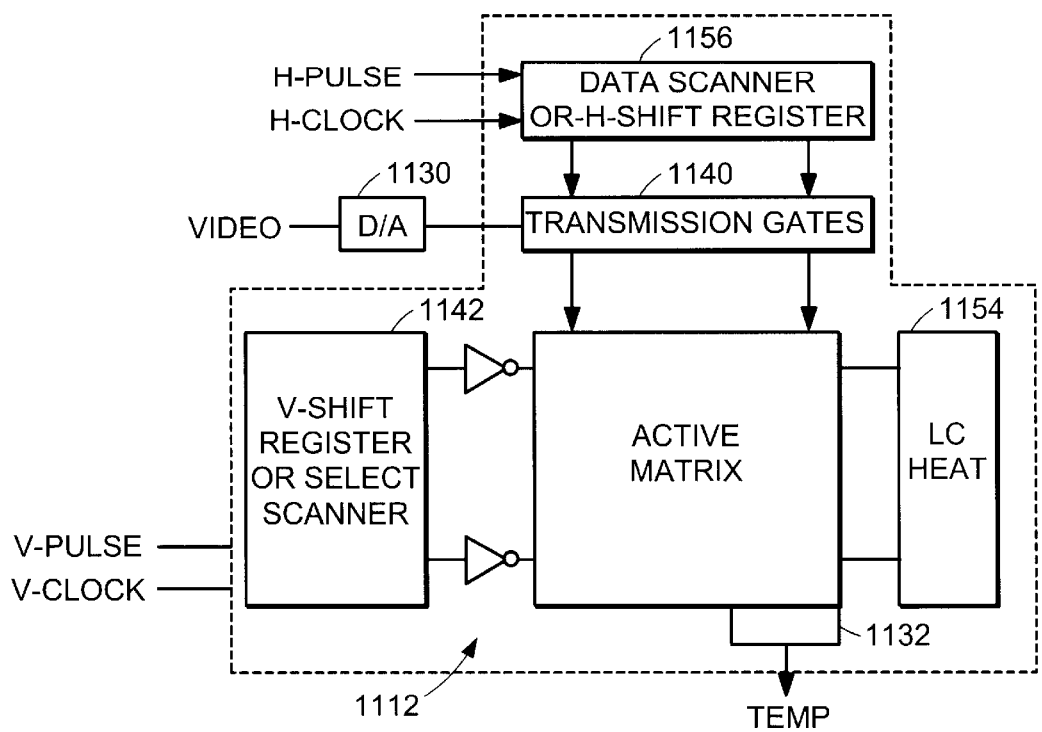
FIG. 15A illustrates an alternative preferred embodiment of the display with a heat gate.
Figure 15B:
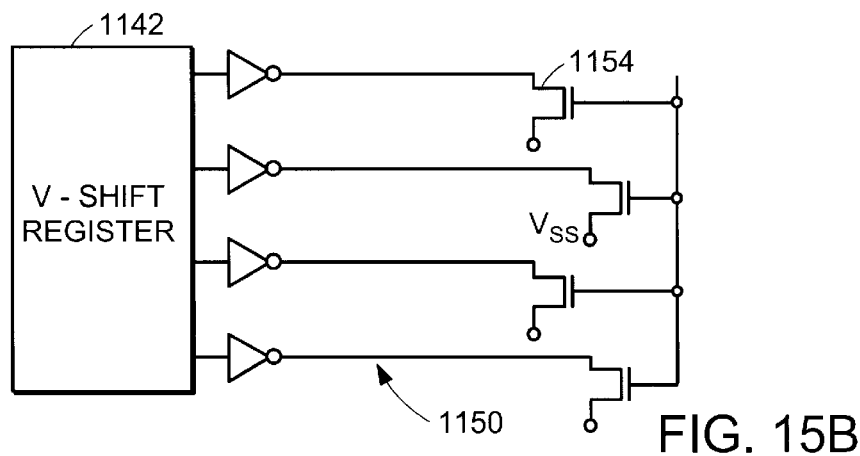
FIG. 15B illustrates a portion of the display shown in FIG. 15A.
Figure 15C:
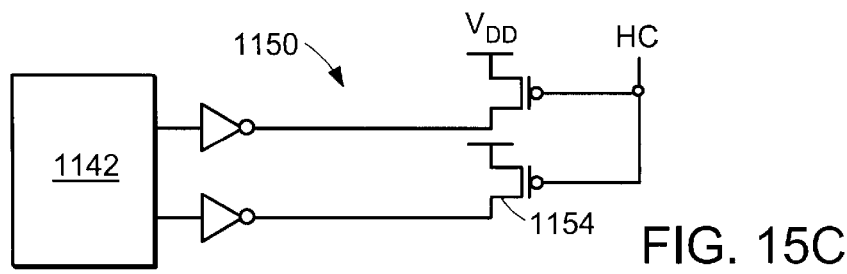
FIG. 15C illustrates an alternative embodiment of a portion of the display shown in FIG. 15A.

FIG. 14 illustrates the creation of a yellow pixel for the first pixel and the last pixel, similar to what is shown in FIG. 11B, but resetting or modulating $V_{COM}$ after each subframe. The video for the pixel is set to drive the pixel black for the blue subframe and allow it to relax for the red and the green subframes, as represented by the square wave. In the first subframe in FIG. 14, the blue subframe, the liquid crystal for both the first pixel and the last pixel are shown at a steady state black. The first pixel receives its signal at the beginning of the red subframe and the liquid crystal begins to relax. The last pixel receives its signal at some time later, 3 milliseconds in a preferred embodiment, and the liquid crystal begins to relax at that time. The liquid crystal related to the first pixel and the last pixel are at different points in the transition to clear when the red LED flashes, therein producing different level of red as in FIG. 11B. However, in contrast to the previous embodiment, the $V_{COM}$ modulates so that the clear (white) pixels reset to black. This is represented by the downward slope between the red subframe and the green subframe.

The next color to flash is green. The first pixel receives its signal at the beginning of the green subframe and the liquid crystal begins to relax. The last pixel receives its signal at some time later, 3 milliseconds in a preferred embodiment, and the liquid crystal begins to relax at that time. When the LED for green flashes, the liquid crystal for the two pixels are in different points of transition to clear, therefore there is a different level of green. However, in contrast to the previous embodiment, the liquid crystal has not had more time to transition prior to the flash of the green LED compared to the red LED. The color is thus more uniform in that both the first pixel and the last pixel have the same ratio of red to green.

Still referring to FIG. 14, the next subframe is the blue subframe. The pixels are driven black by $V_{COM}$ modulation, as represented by the slope between the green subframe and the blue subframe. In contrast to the previous embodiment, both the first pixel and the last pixel are driven black at the same time. The last pixel is therefore not still transitioning when the blue LED is flashed. With the $V_{COM}$ modulation, while there are still variations of luminosity from the top to the bottom, there is now uniform color.

Referring back to FIG. 12A, the display circuit has an additional line, a temperature sensor line 1148, which runs from the display 1112 to the timing control circuit 1122. The active matrix comprises a plurality of pixels arranged in columns and rows. Heat is preferably absorbed substantially uniformly throughout the liquid crystal material. However, there may be local temperature variations due to the nature of the image being displayed as well as display and heater geometry and environmental conditions. Temperature sensors can be distributed throughout the active matrix region including around the perimeter of the active matrix including the corners and also disposed near the center of the active matrix. The use of a temperature sensor is described in U.S. patent application Ser. No. 08/364,070 filed Dec. 27, 1994 and is incorporated herein by reference.

The characteristics of the liquid crystal material effected by the temperature of the liquid crystal. One such example is the twist time of twisted-nematic liquid crystal material, which is shorter when the liquid crystal material is warm. By knowing the temperature of the liquid crystal, the timing control circuit 1122 can set the duration and timing of the flash of the backlight 1111, therein achieving the desired brightness and minimizing power consumption.

Another preferred embodiment of the display 1112 has an internal heater. Referring back to FIG. 12D, during normal operations, the vertical shift register 1142 has only one row on, so that as the horizontal shift register 1136 moves from column to column only one pixel is affected. After the last pixel on a row is addressed, the vertical shift register 1142 switches the active row. The display 1112 can be placed in a heat mode where each row 1144 is turned on and has a voltage drop across the row to create heat. In the embodiment shown in FIG. 12D, an end 1158 of each row line is connected to $V_{DD}$ and the end near the shift register is driven low thereby creating a voltage differential across each line. The heat is generated since $P=V^2/R$, where R is the resistance of the row lines. In normal operation, only the selected line which contains pixels to be driven low generating heat, not the entire display.

Referring back to FIG. 12B, with the common voltage ($V_{COM}$)high, the actual video signal is scanned into the matrix circuit. After a delay to allow for the liquid crystal to twist into position, the LED backlight 1111 is flashed to present the image. Prior to the next screen or subframe, a heat cycle occurs where all the row lines are driven such that there is a voltage differential across the row. The heating can occur while $V_{COM}$ and the video are being alternated and inverted, respectively, by the frame control line 1131. FIG. 12B shows a heating cycle after each subframe, but the number and time period of heat cycles can be dependent on the temperature of the liquid crystal as determined by the temperature sensor 1132. In cold environments, the digital circuit 1120 can have a warm-up cycle where the heater is turned on prior to the first painting of the screen.

The delay time before beginning the flash and the flash time are shown as identical in FIG. 12B. However, both the delay time (the delay for response time of the liquid crystal) and the flash time can be dependent on the specific color to be flashed. The delay time is dependent on when the liquid crystal associated with the last pixel to be written has sufficient time to twist to allow that specific color to be seen. The duration of the flash, or the point that the flash must be terminated, is dependent on when the liquid crystal associated with the first pixel to be written of the next frame has twisted sufficiently that light from the backlight is visible to the viewer.

The timing control circuit 1122, as seen in FIG. 12A, can vary the flash duration and the delay or response time depending on the color that is to be flashed. In addition, the current to the backlights 1111 can be varied to adjust the intensity of the color. If desired, a color control line 1127 can be added to the timing control circuit 1122 to allow the user to vary the color.

Referring back to FIG. 9, an alternative embodiment for internal heat is shown. A second layer of ITO (Indium Tin Oxide) 1174 underlies the counterelectrode 2085 with an interposed layer of $SiO_2$ 1176. The second layer of ITO 1174 is patterned such that it covers only the array area. If a current is passed through the second layer 1174, it heats and can heat the liquid crystal 2080. Similar to previous embodiments, the heating occurs between the two layers of glass 2090 that bound the matrix 1160.

The measuring of the temperature of the liquid crystal requires additional analog circuitry which add complexity to the circuit of the display. It is recognized that it is the operational characteristics of the liquid crystal, not the actual temperature that is ultimately desired. Therefore, the capacitance of the liquid crystal, an electrical measurement, can be done in place of the measurement of the temperature in order to determine when heating is required.

One of the traits of liquid crystal that is desired is the long time constant which allows the image to be maintained without having to refresh in certain instances. Single crystal silicon using CMOS technology provides circuitry with extremely low leakage currents. In combination with high quality Liquid Crystal (LC) material the low leakage of the circuitry and extremely high resistance of the LC can produce long time constants. These time constants can be in the order of several minutes. Therefore, a residual image can be retained depending on the point where the scanning circuitry stops functioning during power offs.

Figure 16:
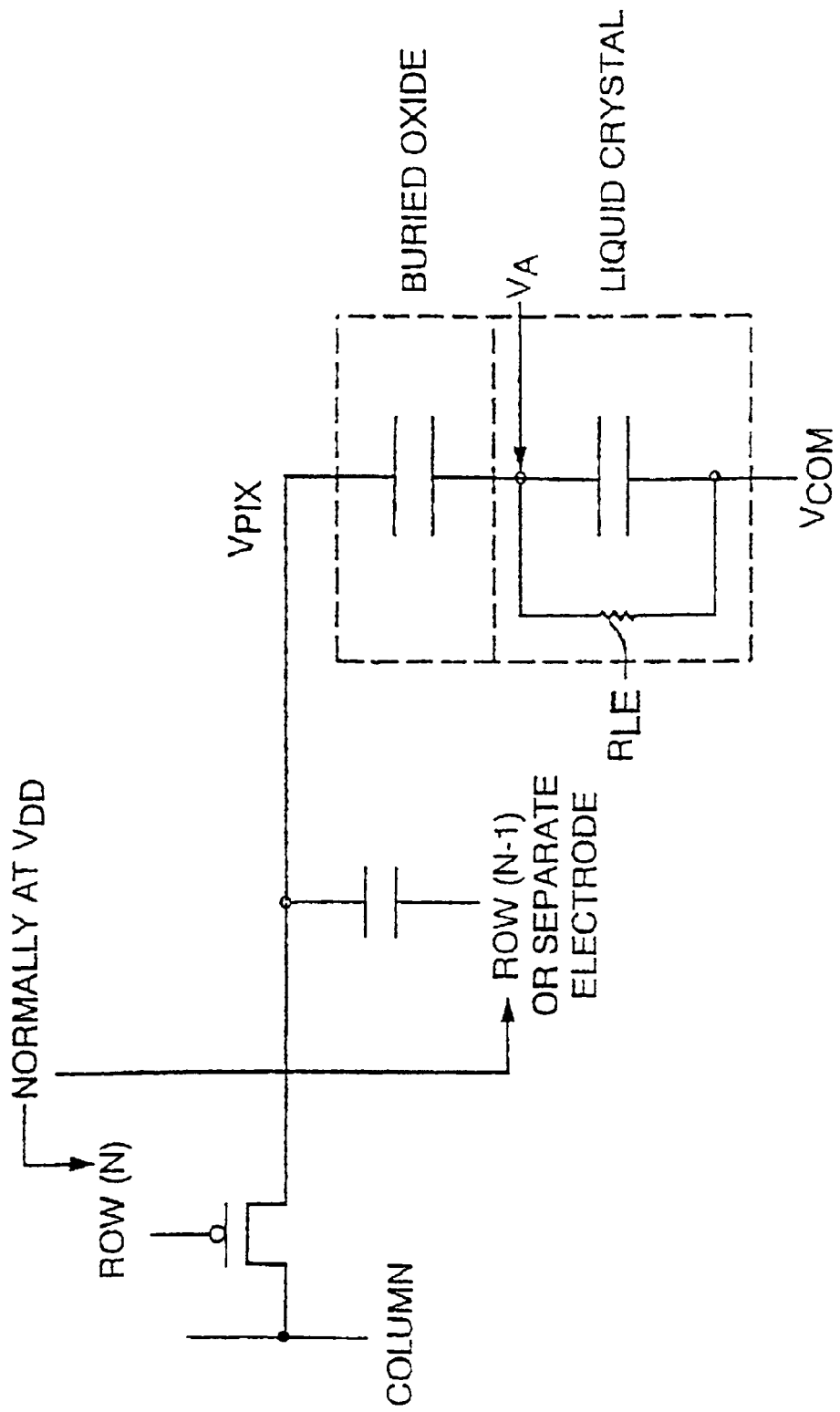
FIG. 16 is a illustrates of a pixel element in a display.

A pixel element is illustrated in FIG. 16. The pixel element has a transistor (TFT) which is connected to the row line, which goes from normal $V_{DD}$ to 0 to allow the row to write. The video signal is received through the transistor from the column. The voltage of the pixel to the counter-electrode has a drop over the buried oxide, see FIGS. 7 and 11, which acts as a capacitor and over the liquid crystal, which acts as a resister and capacitor in parallel. In addition, the pixel electrode has a storage capacitor formed between the TFT and the previous row line.

Figure 17:
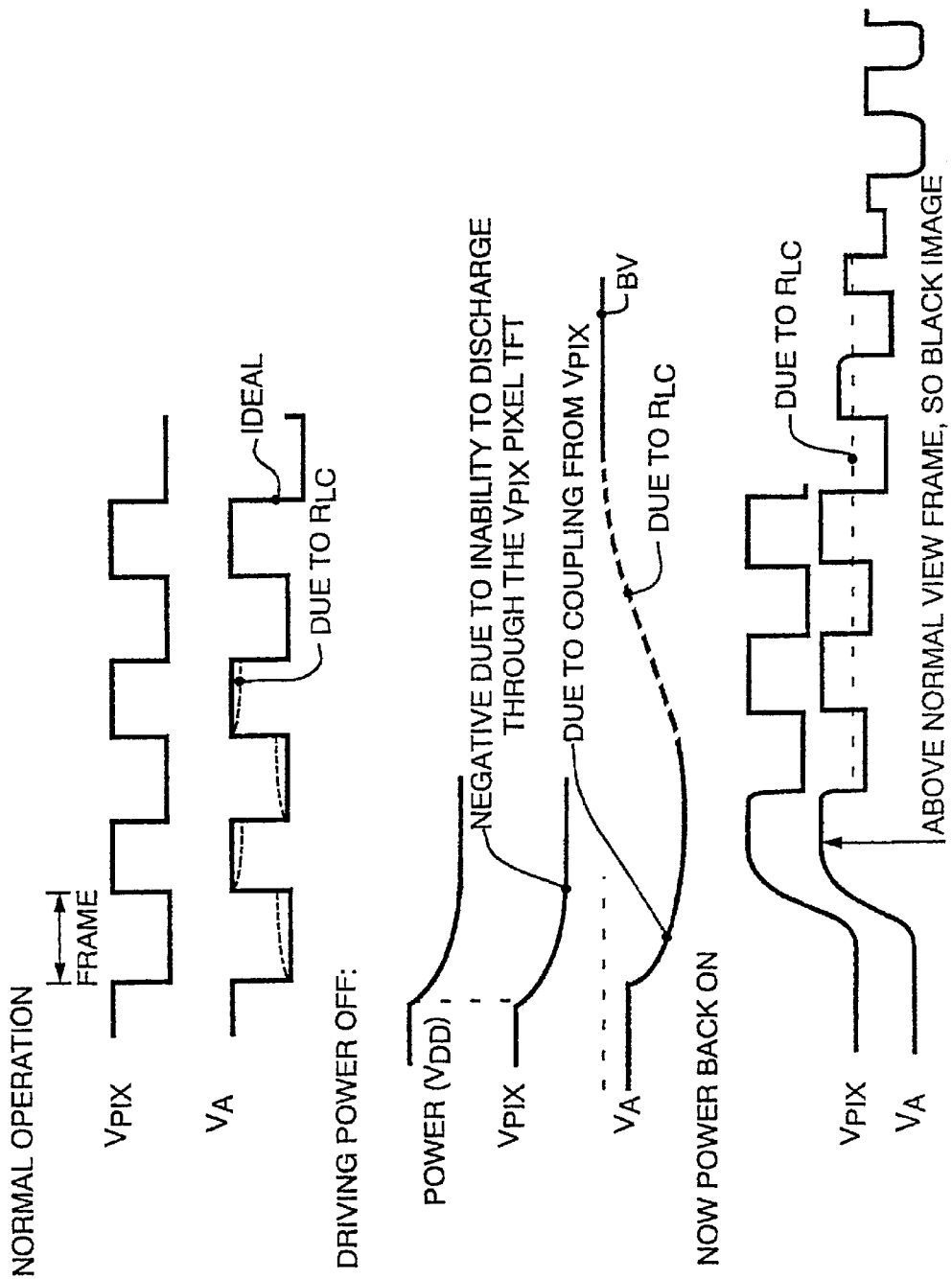
FIG. 17 is a graphical representation of voltage of the pixel electrode as power is turned off and back on in the prior art.

Referring to FIG. 17, in normal operation the voltage of the pixel is fluctuating. The voltage at the point ($V_A$) between the buried oxide and the liquid crystal generally follows the pixel voltage, but is lower because of the drop across the buried oxide and drops because of the resistance of the liquid crystal ($R_{LC}$). When powering off, $V_{DD}$ drops to zero. The pixel voltage ($V_{PIX}$) is unable to discharge through the p-channel pixel TFT and drops. VA which is coupled to $V_{PIX}$ drops likewise. If a sufficient time transpires, VA will return to zero due to the $R_{LC}$.

However, if the power is turn back onto the display prior to the natural discharge time, a portion of the image may be seen for several seconds. $V_{PIX}$ goes positive when the power comes on and since VA is couple it goes positive above creates a black image. VA would in several minutes return to normal due to $R_{LC}$.

Figure 18:
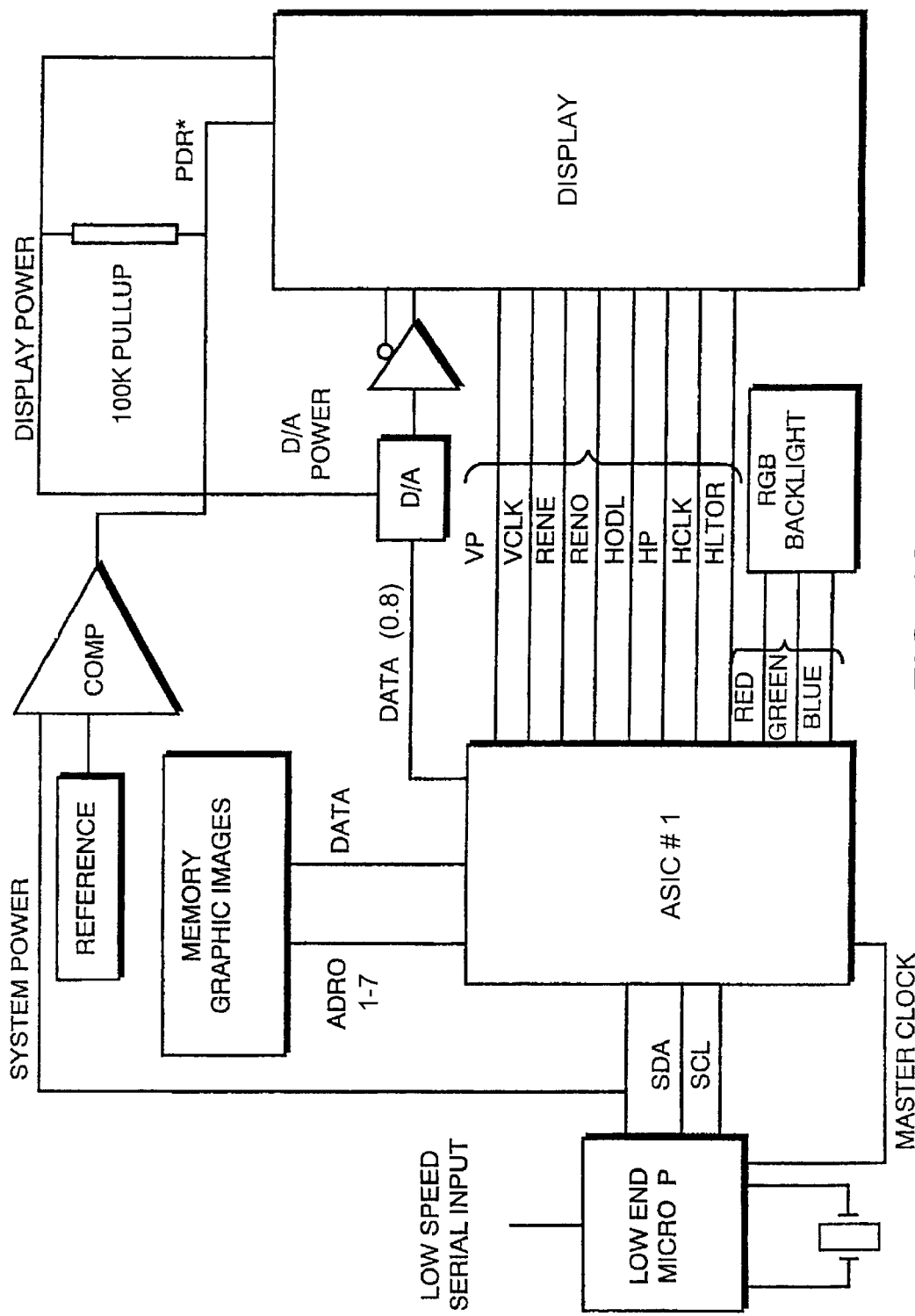
FIG. 18 illustrates a preferred embodiment of display control circuits in accordance with the invention

A display circuit is illustrated in FIG. 18. In this embodiment, a digital circuit 120 is used to control color sequential display operation. The processor 134 receives serial digital image data at 121 and sends display data to memory 124. The timing control circuit 122 receives clock and digital control signals from processor 134 and transmits control signals to the backlight 111 and display 112 along lines 115, 116, 117, and 118, respectively. Lines 128 direct ready, reset, write enable, output enable, color enable, address and data signals to memory to control delivery of image frames to the display 112.

An analog comparator samples the voltage of the main power in real time. When the voltage drops below the level to run the circuit plus some margin, a reset signal (PDR*) is asserted low. On receipt of the PDR* signal the display circuitry will place $V_{DD}$ on all the column lines, see FIG. 2A, and activates all the row lines. The normal timing continues for two or more cycles, therein sequentially activating all the even and odd rows. This clocks the $V_{DD}$ signal on the column lines into every pixel.

Referring back to FIG. 16, $V_{DD}$ will also charge the pixel storage capacitor. In normal operation, the opposite side of the storage capacitor is connected to the previous row line.

By activating all the even row lines, (i.e., driving them low) and not the odd row lines (i.e., maintaining high), the storage capacitors on the even rows will be discharged to 0 volts. ($V_{DD}$ is high logic level). On the next cycle the odd rows storage capacitors will be discharged. Because the storage capacitor is several times larger than the pixel capacitor, the voltage on the storage capacitor will then discharge the pixel capacitor to 0 volts. At this point the display can be de-energized without any residual charge left on either the storage or pixel capacitor.

Figure 19:
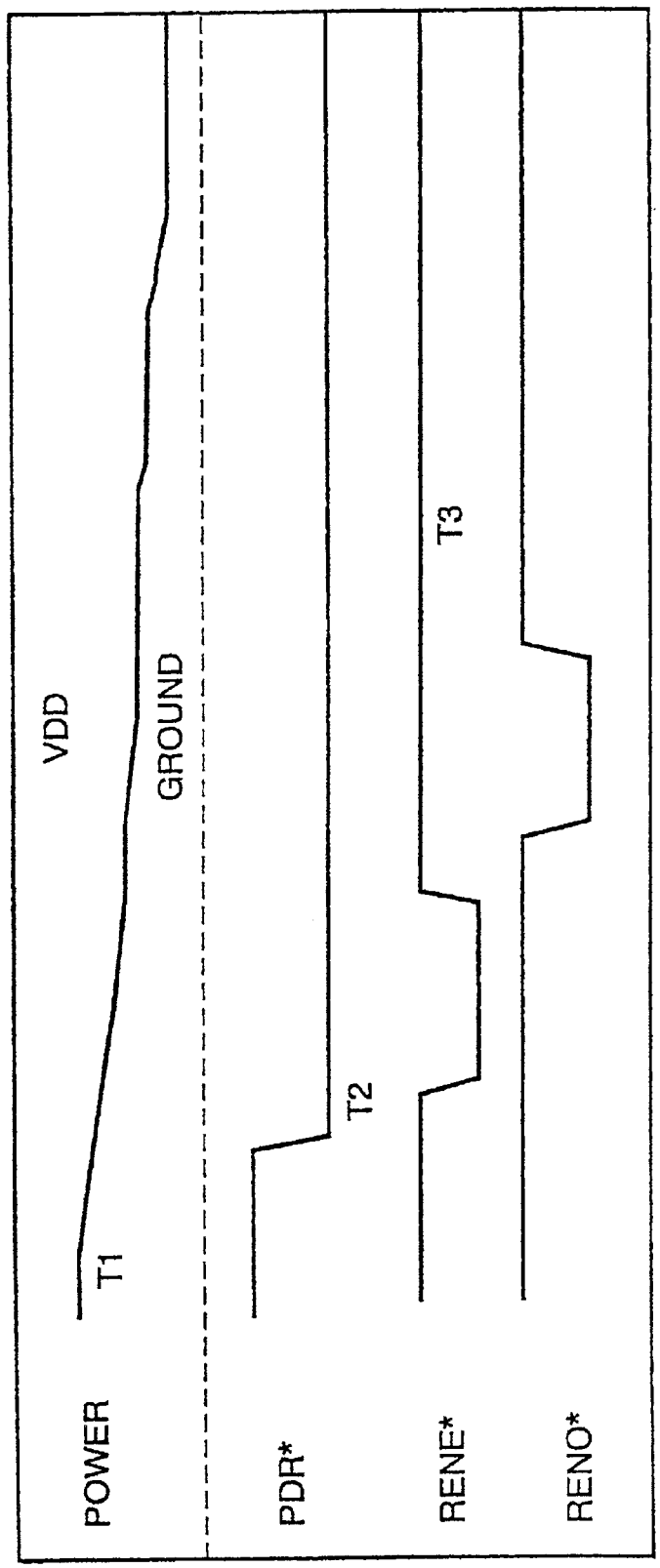
FIG. 19 is a graphical representation of the control signal as power is turned off in accordance with the invention

FIG. 19 illustrates a timing diagram. The system power is turned off at time T1 and shown as a classical discharge as the logic continues to run powered by the bypass capacitors. The comparator senses the threshold voltage level and asserts the PDR* low, at time T2. The additional row enable signals are then asserted and completed at time T3. Non additional logic or signals are required after T3 and the power is allowed to randomly discharge. The power down reset will work with column inversion and $V_{COM}$ modulation displays.

Figure 20:
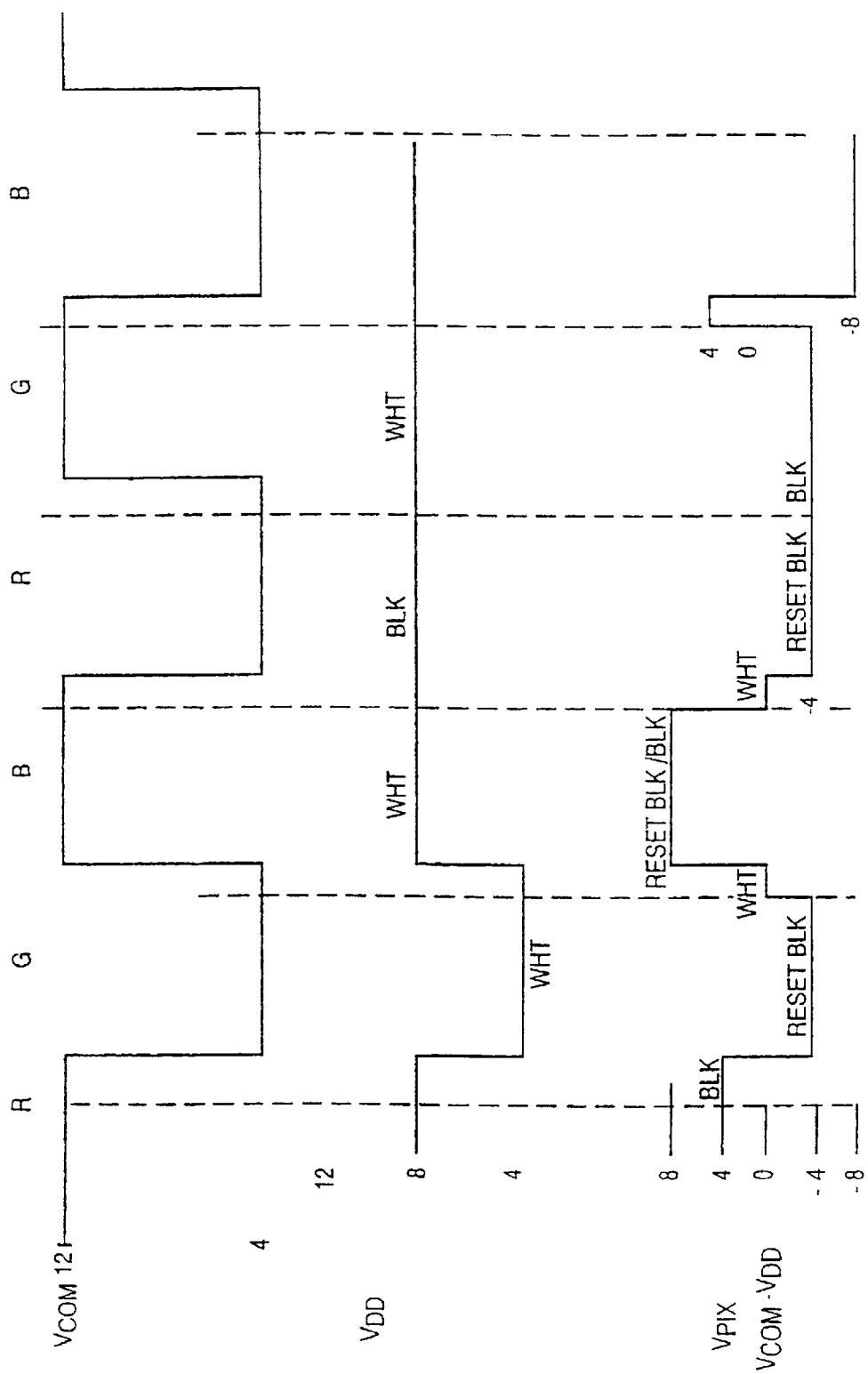
FIG. 20 is a graphical representation of higher voltage $V_{COM}$ reset.

FIG. 20 illustrates a pixel reset having a greater fluctuation of $V_{COM}$ therein resetting the pixel to black in every instance. The $V_{COM}$ has twice the swing of the source voltage. By switching $V_{COM}$ and the video signal after each frame or subframe, a white pixel is reset to black, but a black pixel is also reset to black. The resetting of the $V_{COM}$ changes the base or common ground voltage for the pixel. Therefore if $V_{COM}$ is 12 volts and the pixel is driven to 4 volts, an 8 volt differential results and the liquid crystal is black, and then $V_{COM}$ is set to 4 volts, there is −4 volt differential results and pixel is reset to black. Likewise if $V_{COM}$ is 4 volts and the pixel is allowed to go to $V_{COM}$, a 0 volt differential and the liquid crystal twists to white, and then $V_{COM}$ is set to 12 volts, there is now a 8 volt differential and the pixel is reset to black/black, an overdriven black.

It is recognized that an alternative method for resetting is to address each pixel individually to reset the liquid crystal. This is done in a method similar to the heat cycle.

The embodiments of the color active matrix display described above can be used in various products including wireless communication devices such as pagers, described below, docking stations and cellular telephones, and other devices such as card readers, described below, and digital cameras.

Figure 21A:
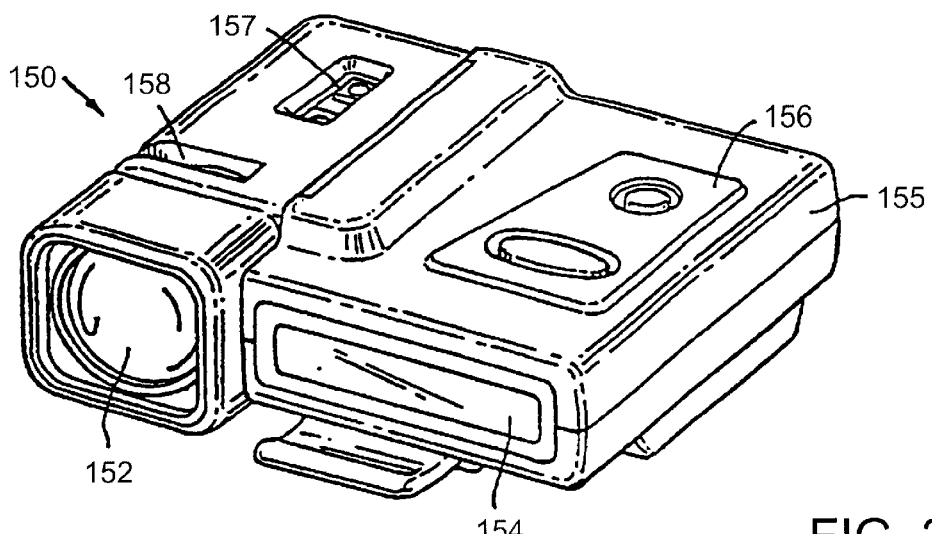
FIGS. 21A–21K are exterior views of hand-held imaging devices.
Figure 21C:
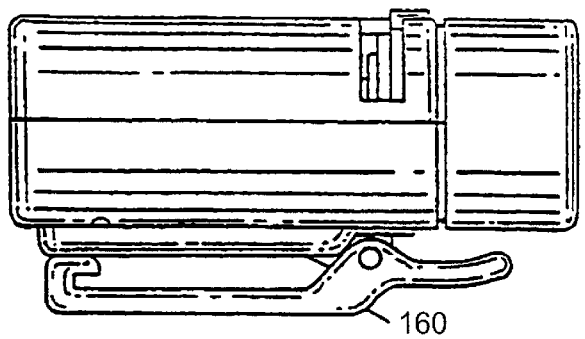
Figure 21B:
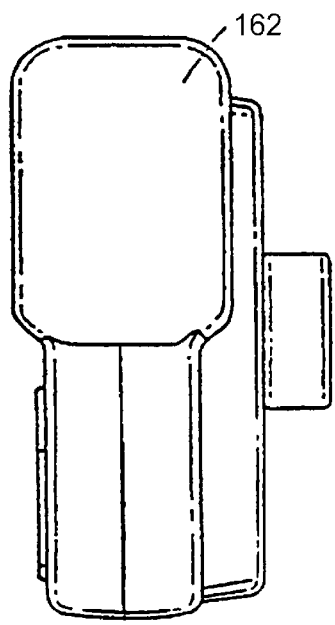
Figure 21D:
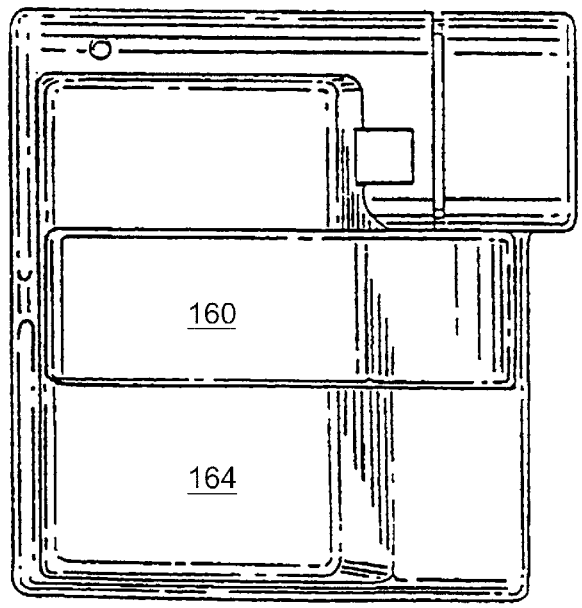

Preferred embodiment of hand held display devices are illustrated in connection with FIGS. 21A–21K. FIG. 21A is a perspective view of a preferred embodiment of a pager system 150 having two display viewing areas 152 and 154 within a housing 155. Viewing area 152 has a lens through which the user views a microdisplay as described previously. A second flat panel display without magnification is viewed by the user at the viewing area 154. The second display is a simple low resolution numeric and/or alphabetic display to read telephone numbers or scrolled numbers or messages. The microdisplay magnification can be adjusted at switch 158. The displays are operated by switches 156, 157. As seen in the rear view of FIG. 21B, the rear surface 162 of the housing 155 is thicker in that portion containing the microdisplay and the battery. In the alternative embodiment illustrated in FIG. 22, the rear panel 162 is removed to expose the cavity 159 for the battery and the rear of the display assembly 161. Also shown in this embodiment is a cover 163 which slides to cover or expose a camera including an image sensor 166 and lens 167. The digital imaging sensor 166 can take images electronically stored within a memory within the pager that can be sent by wireless transmitter to a personal computer, a telephone as described herein, or web browser. The images can also be loaded by wire through port 169 onto a personal computer, or alternatively, can be loaded onto a smart card or flash memory card that can be inserted into one or more card slots 168. The port 169 can also be connected directly to a keyboard or touchpad as described herein. The sideview of the housing 155 shown in FIG. 21C illustrates a clip 160 that is used to fasten the device to the clothing of the user. The clip 160 is attached to the bottom surface 164 of the housing 155 as shown in FIG. 21D.

Figure 21E:
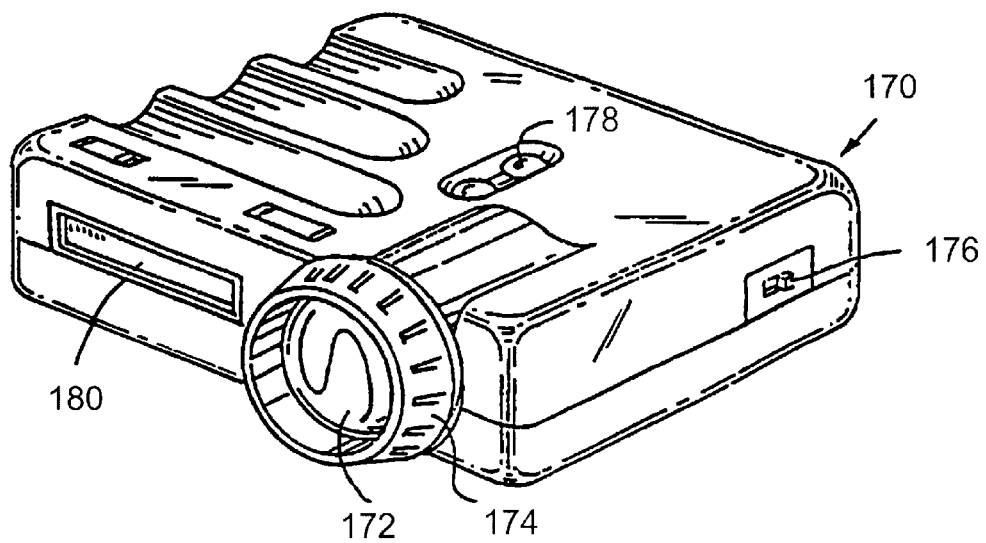
Figure 22:
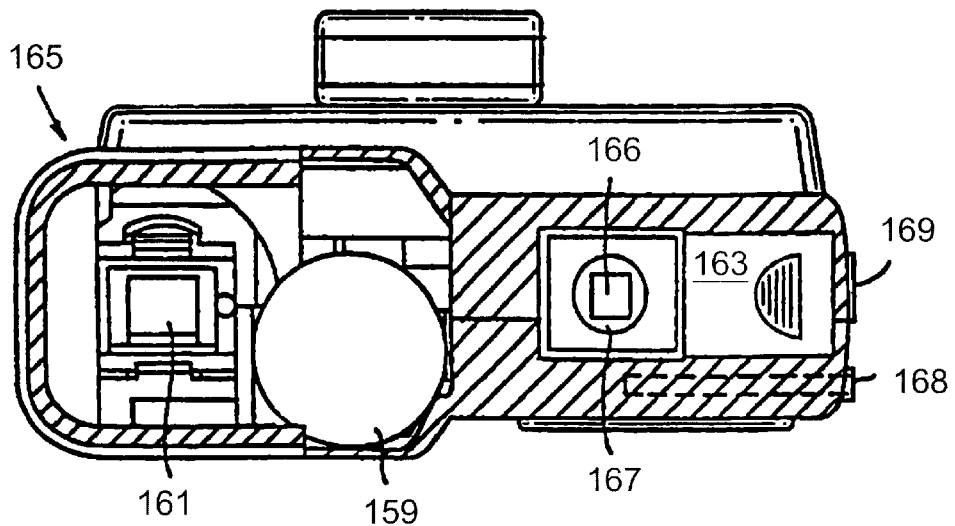
FIG. 22 is a partial cross section rear view of a pager with integrated camera.
Figure 21G:
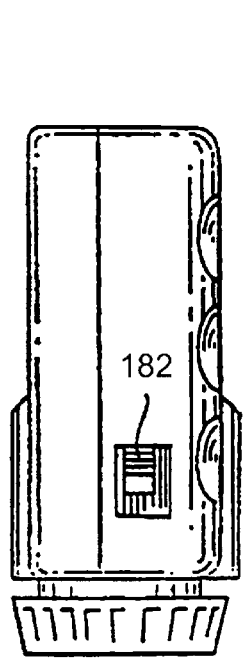
Figure 21F:
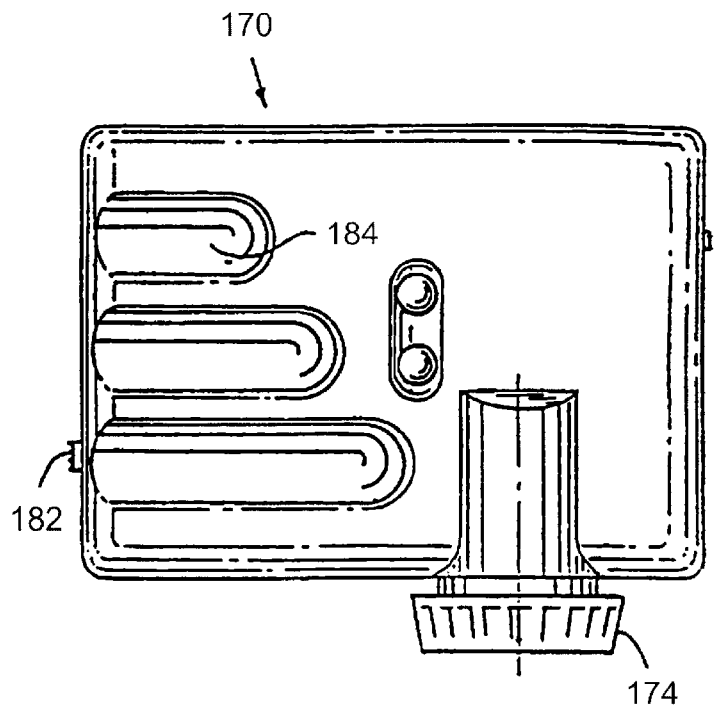

Another preferred embodiment of a hand-held viewing device 170 is illustrated in the perspective view of FIG. 21E. A first display is seen through the lens 172 with magnification being adjusted by the knob 174. A second display 180 as described above is positioned on the same side of the device 170 as the lens 172 for ease of viewing. The displays are operated by switch 176 and buttons or control elements 178. A top view is illustrated in FIG. 21F showing ridges 184 that accommodate the fingers of the user and the second display switch 182, which is shown more clearly in the side view of FIG. 21G.

Figure 21H:
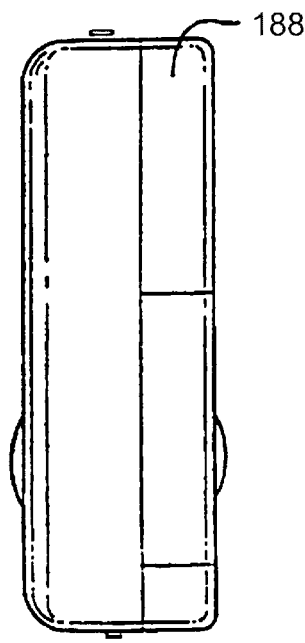
Figure 21I:
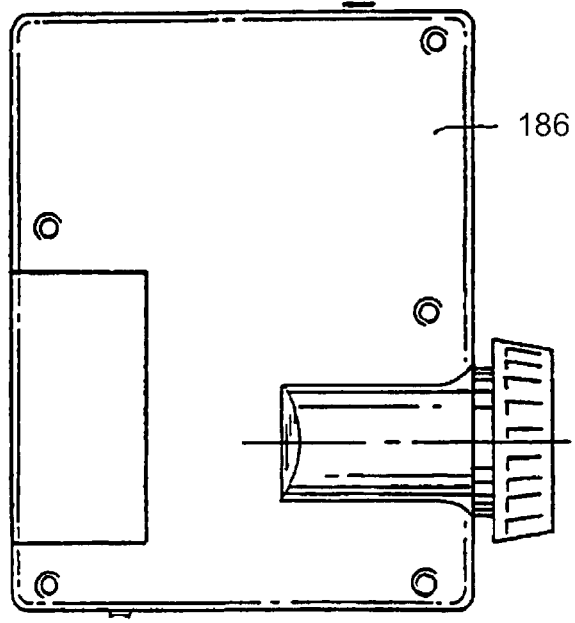

Rear and bottom views of the device 170 show the rear 188 and bottom 186 sides in FIGS. 21H and 21I, respectively.

Figure 21J:
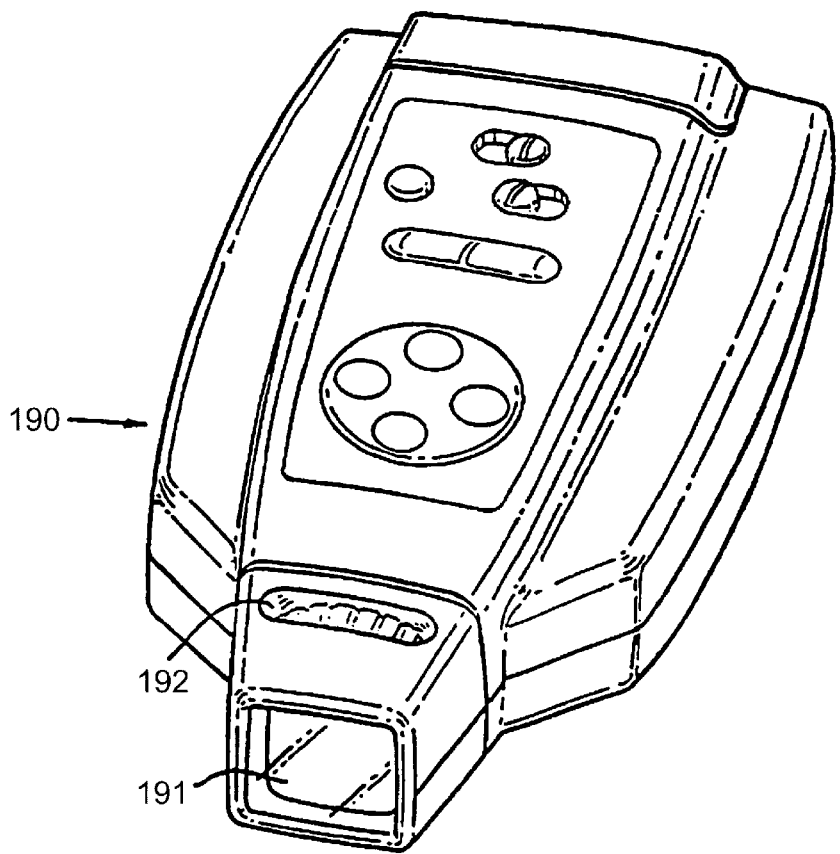
Figure 21K:
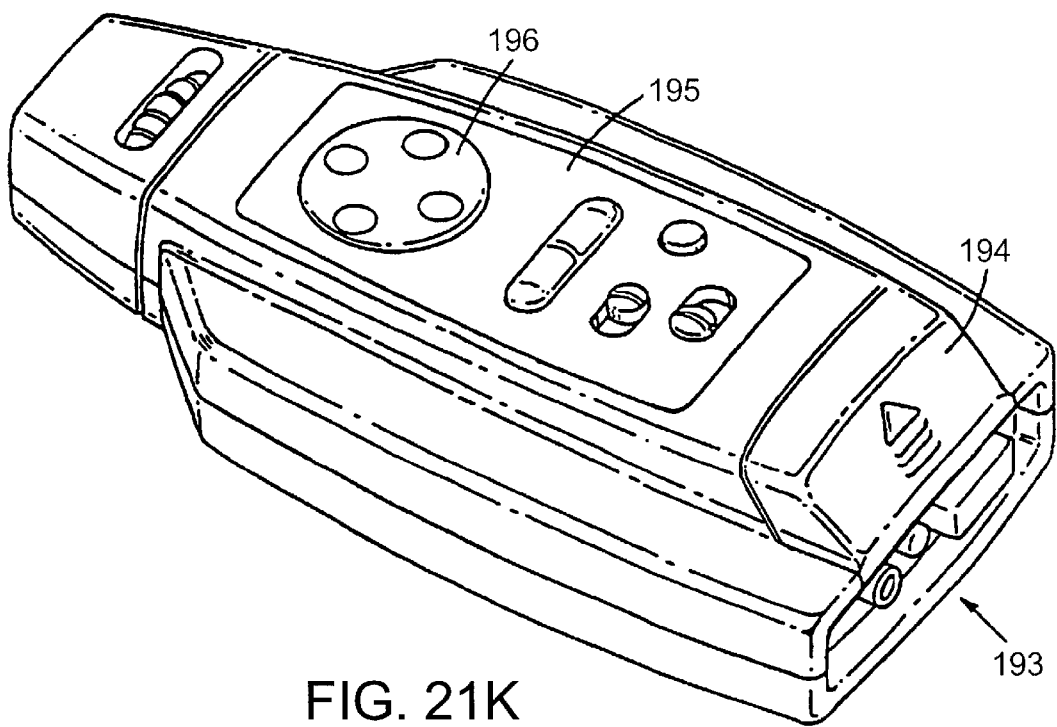

Another preferred embodiment is illustrated in the perspective views of FIGS. 21J and 21K. In the embodiment, a hand held unit 190 has a viewing window 191, a focus control 192, a rear panel 193 with an external port, a battery access panel 194, and a control panel 195 with control elements including a scan control element 196 to move text or the image on display up or down and left or right.

Figure 23A:
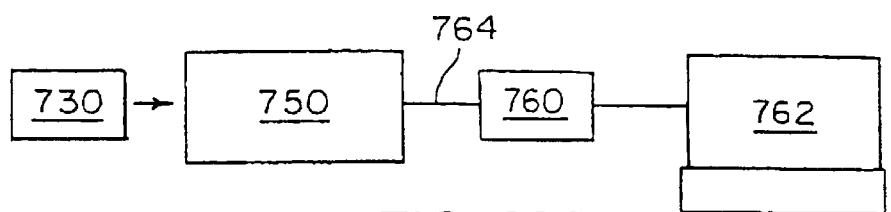
FIG. 23A illustrates a preferred embodiment of a card reader system.

As illustrated in FIG. 23A, the card reader 750 can be connected by wireless modem, telephone or other cable link 764 to an interface 760 such as a personal computer (PC) card to a general purpose computer 762.

Figure 23B:
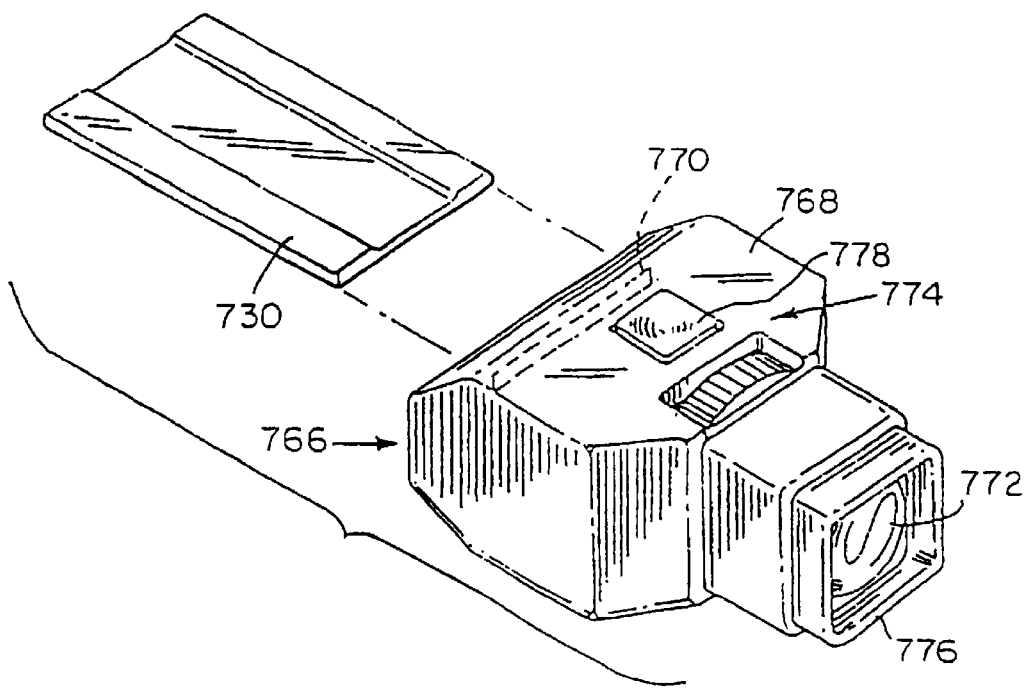
FIG. 23B shows a card reader system.

Another embodiment of the card reader system 766 is illustrated in FIG. 23B. The system includes a housing 768 with a port or aperture 770, shown in hidden line, for insertion of the card 730, or at least that portion of the card that contains the interface, a display system 772 for presenting information to the user, and a control panel 774 that controls reader operation. Similar to the previous embodiment, the system 766 has a card reader, a control circuit, and a internal battery as described previously. The display system 772 can include the color sequential display module as described previously herein and is shown in actual size.

As shown in FIG. 23B, the reader housing 768 has a viewing window 776. The user manipulates the control elements or buttons on a control panel 774 of the reader housing 768 to operate the system. The elements can include an on/off switch 778 and a four way element to scroll the display up, down, left or right.

The card reader system can be used to access or change the data stored on the card or select an option from choices provided through a PCMCIA modem. The user can change the data or make the selection using a four way element 710 and a select button 716.

Figure 24A:
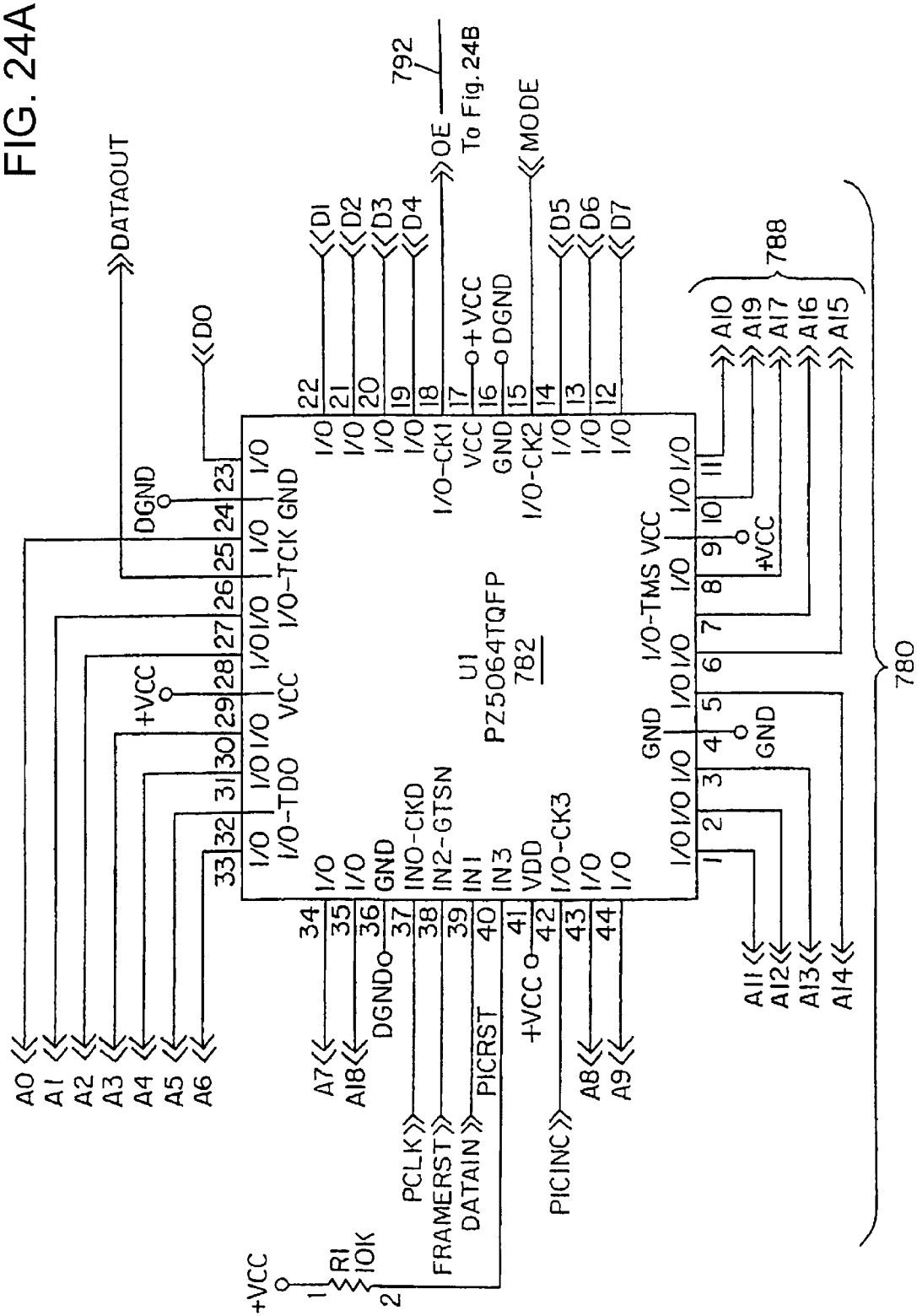
FIGS. 24A–24B is a schematic circuit diagram of a memory card for a card reader or imager.
Figure 24B:
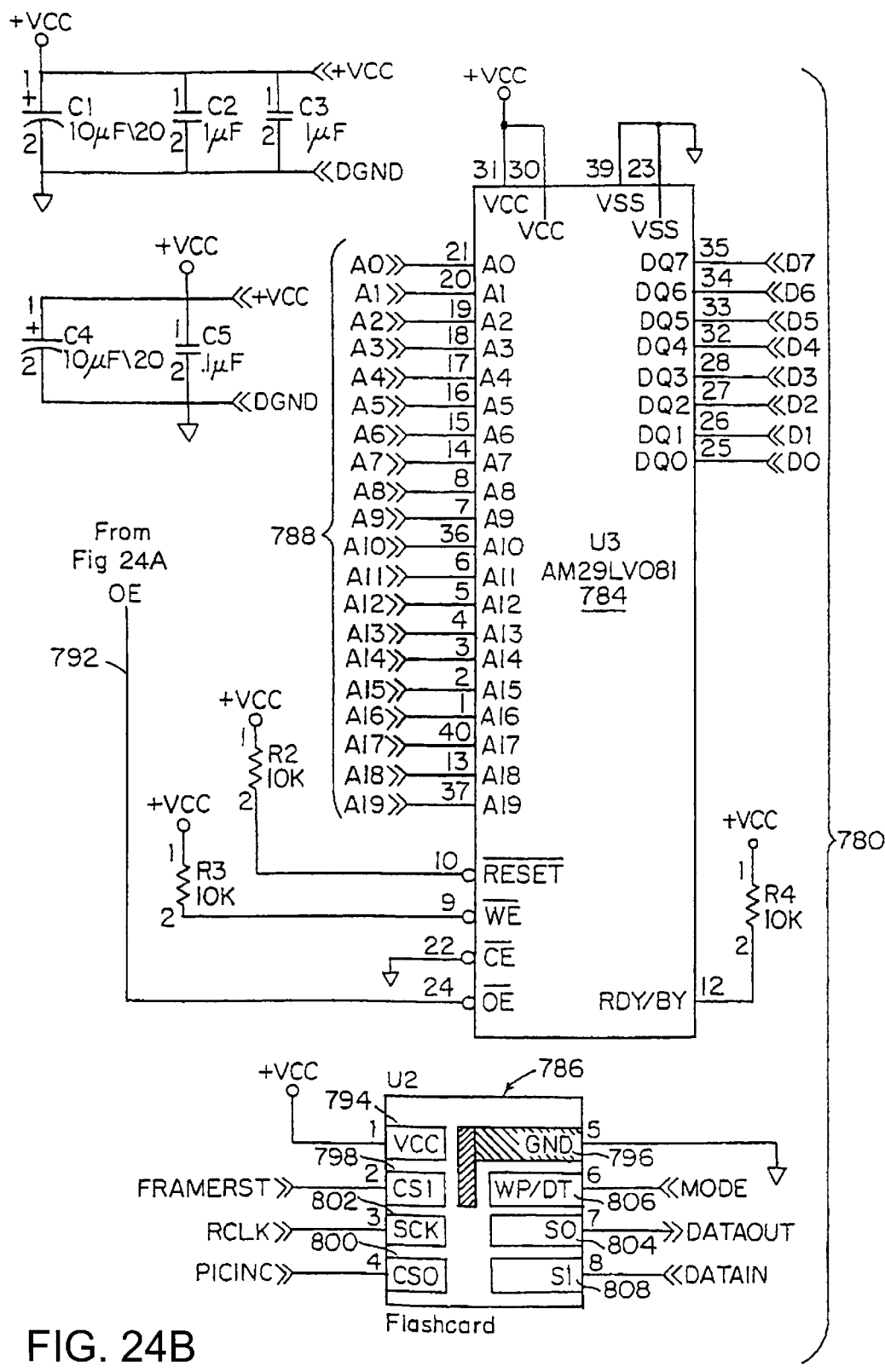

FIGS. 24A–24B disclose a schematic of an embodiment of a circuit 780 for the card 730. The circuit 780 has a control chip 782, a memory chip 784, and an interface chip (flashcard) 786. The control chip 782 takes the images stored on the memory chip 784 and sends the signal to the interface chip 786. The control chip 782 and the memory chip 784 are connected by both address lines 788 and data lines 790. In addition, an output enable (OE) line 792 extends between the control chip and the memory chip to allow the card 730 both to be read and to store data. The control chip 782 takes the image and sends the image in a series of bits to the interface chip 786.

The interface chip 786 has eight connection points 794, 796, 798, 800, 802, 804, 806, and 808 for interacting with an interface connection 816, as illustrated in FIG. 19D, on the card reader 750. The card 730 receives power (voltage) and is grounded through the connections 794 and 796 made on the interface chip 786. The card receives a frame reset signal through a frame reset connection 798 to allow the control chip 782 to know when to send the next frame. A picture increment signal sent through a picture increment connection 800 allows the control chip 782 to shift addresses to another stored picture. A clock signal to the control chip from the clock connection 802 regulates the flow of data. The control chip 782 sends a bit of data for each clock pulse and waits for a signal before starting the next row. The image signal is sent from the memory 784 through the control chip 782 to a data out connection 804 to the card reader 750.

The mode input 806 is used to switch between a read and a write mode. The data in connection 808 is for writing data to the memory.

Figure 25A:
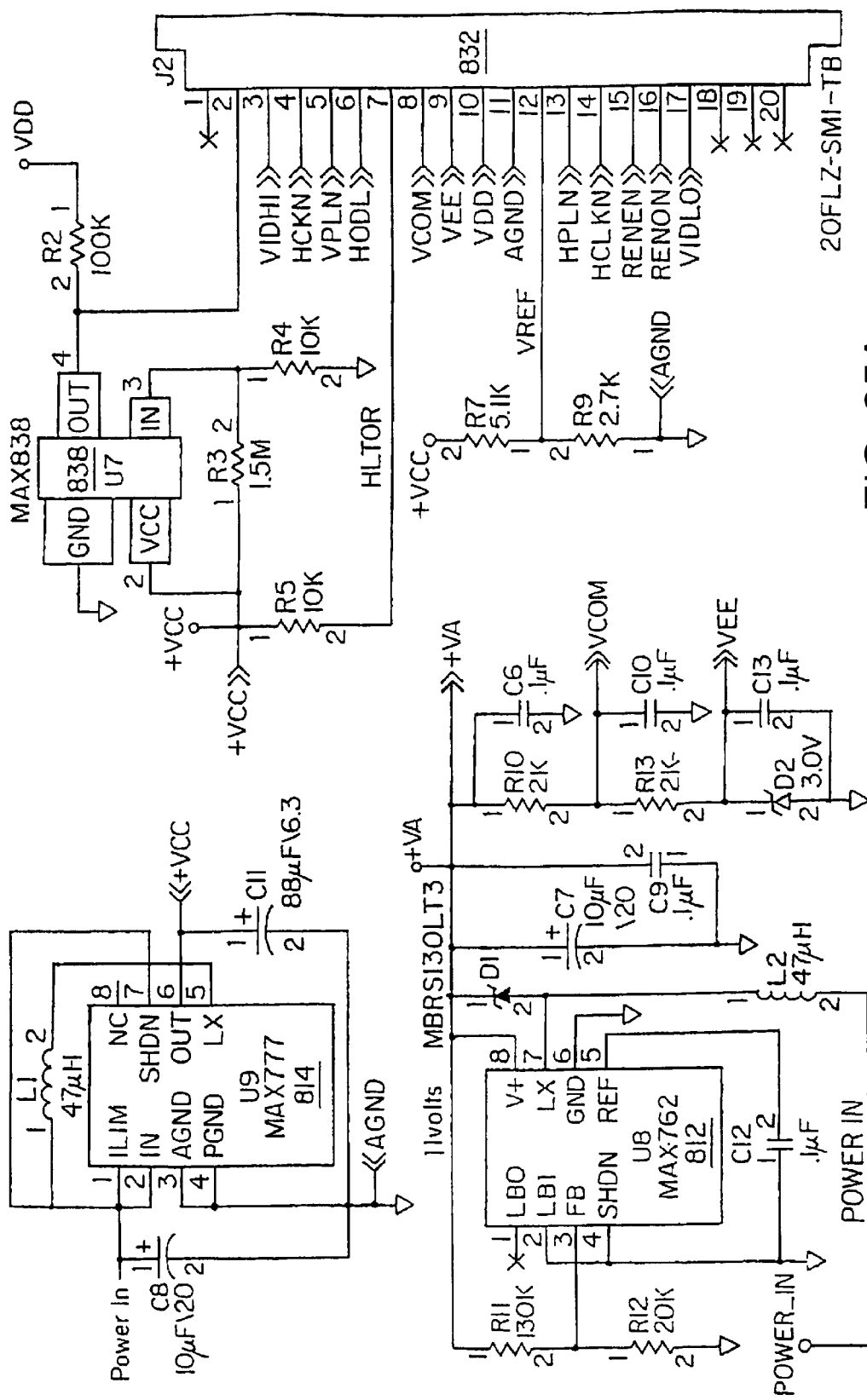
FIGS. 25A–25C is a schematic circuit diagram of the controller within the reader or imager
Figure 25B:
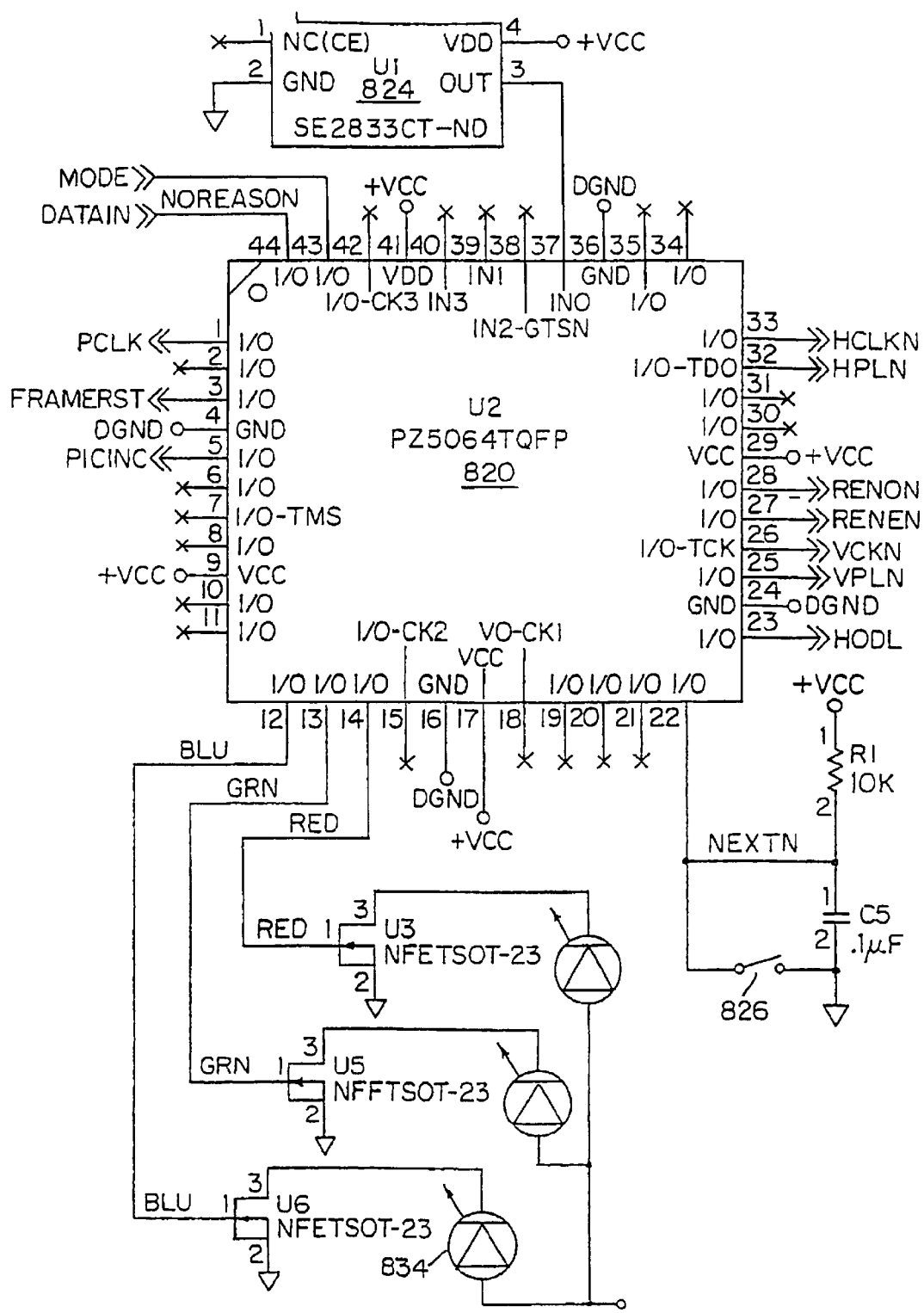
Figure 25C:
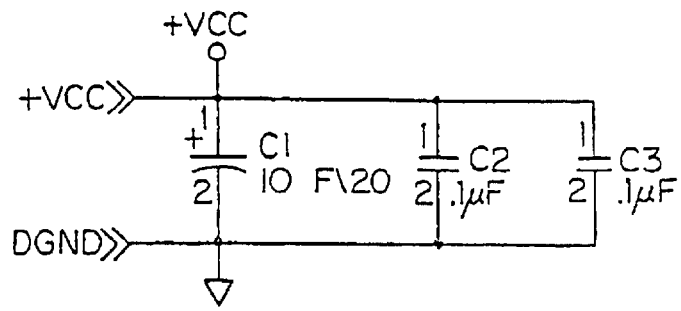
Figure 25C:
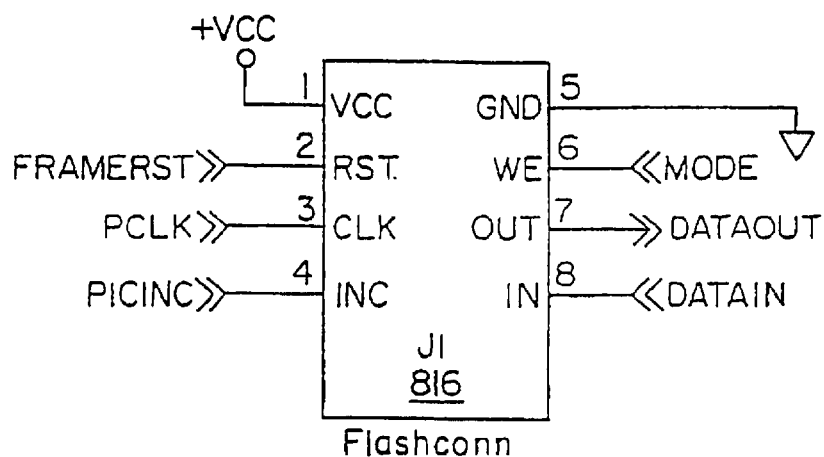
Figure 25C:
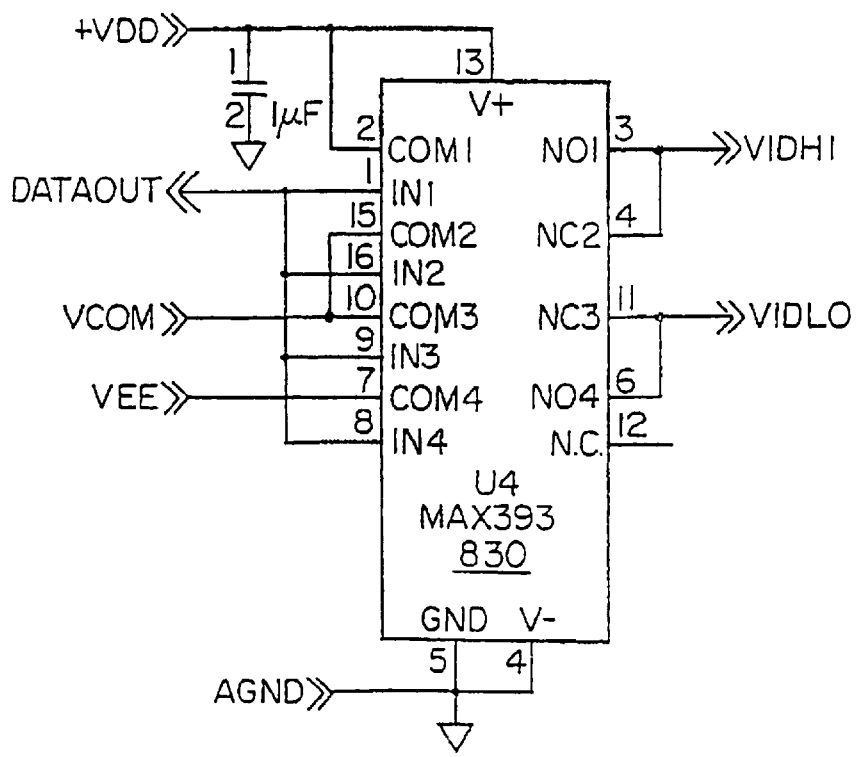

FIGS. 25A–25C illustrate a schematic of a display control circuit 810 in the card reader 750. The display control circuit 810 has a battery, which through a digital power supply 812 and an analog power supply 814, powers the circuit 810 as represented in FIG. 25A. The flash connection 816 of the card reader 750 is the interface with the flashcard 786 of the card 730. The flash connection 816 sends the signals and power described above including the clock, the frame reset and picture increment from a control chip 820. The control chip 820 receives its clock signal from a 20 MHz clock chip 824. The picture increment is set high by a switch 826, which is physically connected to a button on the control panel 774 of the reader housing 768.

The data signal from the card 730 through the flash connection 816 is sent to a switch circuit 830 which sets the signal high ($V_{DD}$) or low ($V_{COM}$) depending if the signal is a high bit (1) or a low bit (0). The video signal is sent from the switch to a connector, which connects to the microdisplay. The connector in addition sends the control signals from the control circuit and power to the microdisplay. The LEDs for the backlight are controlled each by a transistor and a signal from the control chip.

The circuit in addition has a power down reset circuit. The power down reset circuit sends a signal to the microdisplay to clear the image before the power is off.

Figure 26:
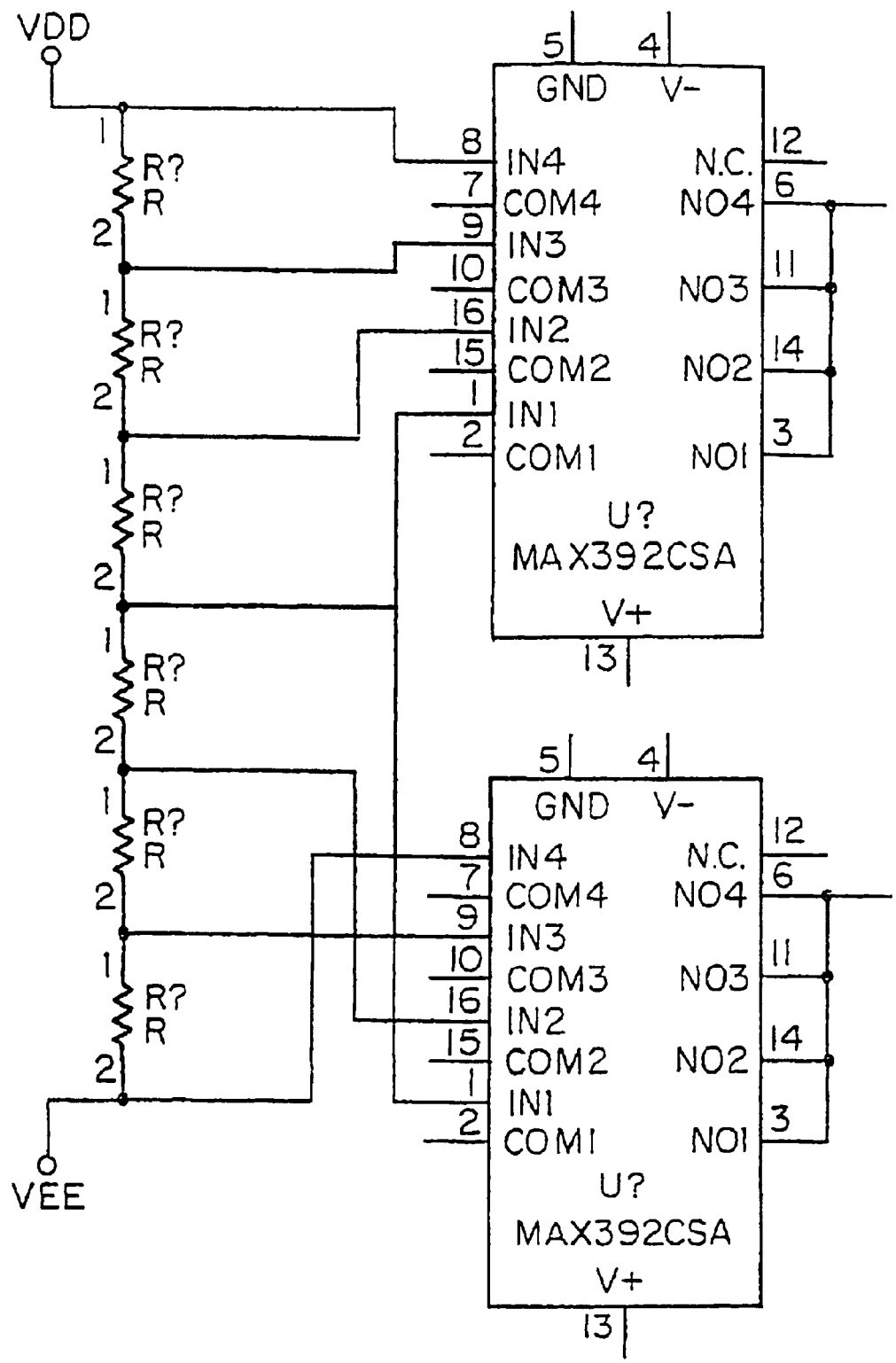
FIG. 26 is a schematic circuit diagram of an alternative embodiment of a switcher in the controller.

FIGS. 25A–25C represent a 1 bit color display control circuit which displays eight colors (red, blue, green, black, white, magenta, cyan, and yellow). By selecting varying voltages between $V_{EE}$ and $V_{DD}$ and having two switches as illustrated in FIG. 26, a 2 bit color display control circuit having 64 colors is possible. It is recognized that a greater number of colors is desired, but for items such as pagers and cellular telephones, the wireless transmission rate may limit the bits available for transmitting image data. With these limited transmission rates the available number of colors for display is reduced until better compression systems and transmission rates are available. With limited colors because of transmission rates, a switch chip is preferred to a video processor because of power requirements. For items such as cameras and other products not including wireless transmission 8 bit color displays having 16 million colors are preferred.

The display module shown in FIG. 23B can be equipped with an antenna and television receiver to provide a pocket size color television.

Equivalents

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of controlling an active matrix display having an array of transistor circuits formed in a first plane, each transistor circuit being connected to a pixel electrode in an array of pixel electrodes, and a counterelectrode panel extending in a second plane that is parallel to the first plane, there being a layer of liquid crystal between the first plane and the second plane, the method comprising:

selecting a high or a low common voltage with a switching circuit under the direction of a display control circuit connected to the active matrix display;

applying the selected common voltage to the counter electrode panel;

actuating the transistor circuits in the array to scan an image into the matrix display with the display control circuit;

flashing a light source to illuminate the image with the display control circuit;

switching the common voltage applied to the counterelectrode panel to erase the image with the switching circuit;

inverting image data after the image has been scanned into the matrix display with a second switching circuit, and scanning the inverted image into the matrix display; and controlling the timing of the actuating, flashing, switching, and inverting with a timing circuit.

2. The method of claim 1, further comprising switching the applied voltage at a rate of at least 60 Hz.

3. The method of claim 2 further comprising switching the applied voltage at a rate of at least 170 Hz.

4. The method of claim 1 wherein the light source includes at least two different color light sources, and further comprising sequentially repeating the actuating, flashing, switching, and inverting for each color.

5. The method of claim 4 wherein the light source is a backlight source having at least one red LED, one green LED, and one blue LED.

6. The method of claim 5 further comprising the repeating actuating, flashing, switching, and inverting to create the image at a rate of at least 170 Hz.

7. A method of controlling an active matrix display having an array of transistor circuits formed in a first plane, each transistor circuit being connected to a pixel electrode in an array of pixel electrodes, and a counterelectrode panel extending in a second plane that is parallel to the first plane, there being a layer of liquid crystal between the first plane and the second plane, the method comprising:

selecting a setting for a high or a low common voltage with a switching circuit under the direction of a display control circuit connected to the active matrix display, one setting being used to present an image and the other second being used to erase the image;

applying the selected common voltage to the counter electrode panel;

actuating the transistor circuits in the array to scan the image into the matrix display with the display control circuit;

flashing a light source having at least one red LED, one green LED, and one blue LED to illuminate the image with the display control circuit;

switching the common voltage applied to the counterelectrode panel to erase the image with the switching circuit;

inverting image data after the image has been scanned into the matrix display with a second switching circuit, and scanning the inverted image into the matrix display;

initializing the pixel electrodes to a selected state prior to the scanning of a further image;

controlling the timing of the actuating, flashing, switching, inverting, and initializing with a timing control circuit; and sequentially repeating the actuating, flashing, switching, inverting, and initializing at a rate of least 170 Hz.

* * * * *